United States Patent [19]
Kloker et al.

[11] Patent Number: 5,479,445
[45] Date of Patent: Dec. 26, 1995

[54] MODE DEPENDENT SERIAL TRANSMISSION OF DIGITAL AUDIO INFORMATION

[75] Inventors: Kevin L. Kloker, Arlington Heights; Thomas L. Wernimont, Palatine, both of Ill.

[73] Assignee: Motorola, Inc., Schaumburg, Ill.

[21] Appl. No.: 409,917

[22] Filed: Mar. 24, 1995

Related U.S. Application Data

[63] Continuation of Ser. No. 939,344, Sep. 2, 1992, abandoned.
[51] Int. Cl.$^6$ .............................. H04B 13/02; H04B 1/38
[52] U.S. Cl. .............................. 375/220; 375/290; 381/29
[58] Field of Search ..................... 375/286, 220, 375/290, 219, 291, 289, 377; 381/2, 3, 7, 29, 30; 455/73

[56] References Cited

U.S. PATENT DOCUMENTS

| | | | |
|---|---|---|---|
| 5,182,746 | 1/1993 | Hurlbut et al. | 370/100.1 |
| 5,214,705 | 5/1993 | Kloker et al. | 381/2 |
| 5,258,999 | 11/1993 | Wernimont et al. | 375/7 |

OTHER PUBLICATIONS

"AES Recommended Practice for Digital Audio Engineering–Serial Transmission Format for Lin early Represented Digital Audio Data" published by Audio Engineering Society in 1985, pp. 1–9.
"CP–340 Digital Auto Interface" published by the Standards of Electronic Industries Association of Japan in Sep. of 1987, pp. 1–32.
"CS4215 16–Bit, 48kHz, Multimedia Audio Codec" published by Crystal Semiconductor Corporation in Mar., 1992, pp. 1–30.
"DSO56401 AES/EBU/CP340 Digital Audio Transceiver" published by Motorla, Inc. in 1992, pp. 1–84.
"AESIC: AES/EBU Interface Transceiver" published by BBC in Sep., 1989, pp. 1 and 2.
"CX23053–Digital Audio Data Receiving and Demodulating IC" published by Sony, p. 1. pp. 1–9.
"CXD1211P–Digital Audio Data Modulation and Transmission IC" published by Sony, p. 1.
"CX23033–Digital Audio Data Modulating and Transmitting IC" published by Sony, p. 1.
"YM3613B Digital Audio Interface Transmitter (DIT)" published by Yamaha LSI in 1988, pp. 1–9.

*Primary Examiner*—Stephen Chin
*Assistant Examiner*—Bryan E. Webster
*Attorney, Agent, or Firm*—Elizabeth A. Apperley

[57] ABSTRACT

A transceiver (20) communicates audio and non-audio data between a variety of digital audio sources and sinks. Transceiver (20) has a receiver (34, 38) which communicates data between a modulated digital audio source (12) and an unmodulated digital audio sink (28), and a transmitter (42, 46) which communicates data between an unmodulated digital audio source (22) and a modulated digital audio sink (16). Digital data is transferred from receiver (34, 38) or received in transmitter (42, 46) in one of a plurality of eight formats. Each of the formats is designed to enable transceiver (20) to interface with a variety of digital audio sinks and sources without additional circuitry. A plurality of mode control pins determine the format provided to transceiver (20) when transmitting or receiving digital audio data.

26 Claims, 10 Drawing Sheets

MODE DEPENDENT SERIAL TRANSMISSION OF DIGITAL AUDIO INFORMATION

This application is a division of prior application Ser. No. 07/939,344, filed Sep. 2, 1992, abandoned.

CROSS REFERENCE TO RELATED APPLICATION

This application is related to our commonly assigned copending patent applications filed previously and entitled:

1. "A CIRCUIT AND METHOD FOR COMMUNICATING DIGITAL AUDIO INFORMATION" by Kevin L. Kloker and Thomas L. Wernimont, U.S. Pat. No. 5,214,705, granted on May 25, 1993, and
2. "SERIAL INTERFACE BUS SYSTEM FOR TRANSMITTING AND RECEIVING DIGITAL AUDIO INFORMATION" by Kevin L. Kloker, Thomas L. Wernimont, and Clif Liu, U.S. Ser. No. 07/939,770 and U.S. Pat. No. 5,359,626.

1. Field of the Invention

This invention relates generally to a communications system, and more particularly to modes of serial transmission in a communications system.

2. Background of the Invention

In a digital communications system, digital audio data and control information is transmitted in a predetermined serial transmission format such as AES-EBU or CP-340. The AES-EBU format (Audio Engineering Society/European Broadcast Union) was developed for professional digital audio and the CP-340 format was developed for both commercial and professional digital audio. Both the AES-EBU and CP-340 formats were developed for serial transmission of two channels, each having digital audio data and non-audio, or control, data from a transmitter to one or a plurality of receivers.

The AES-EBU and CP-340 formats transmit digital audio and non-audio data in a series of frames. The digital audio and non-audio data is typically sampled periodically by a source frequency and formed into a left audio or a right audio channel of two's complement data. The left and the right channels of digital audio and non-audio data each form a subframe. The digital audio and non-audio data is transferred in a Manchester encoded format.

Two subframes, one for left channel information and a second for right channel information, are transmitted in sequence in any one period of the source frequency. The two subframes may also be collectively referred to as a frame. In the AES-EBU format, each subframe has a length of thirty-two time slots, where each time slot corresponds to a data bit of digital audio or non-audio information. Typically, the first four bits of each subframe are preamble bits. Preamble bits are encoded to synchronize a receiver to the source frequency of the transmitter. The next twenty-four bits transfer audio data information in two's complement form. The remaining four bits transfer control information. For example, a first one of the control bits is generally referred to as a validity (V) bit. The V bit indicates if the previous audio data information was transmitted to the receiver without any errors. A next bit is the user (U) data bit. The U bit contains user data which is associated with either the left or right audio channel. A following bit is the channel status (C) bit. The C bit is used to form a group of data bits to control transmission of audio and control information. For each of the left and right audio channels, a block is formed by accessing the C bit of each of 192 successive frames. A start of the block is identified by the preamble of the subframes. The last of the thirty-two bits of a subframe is the (P) parity bit. The P bit indicates even parity of the subframe currently transmitted. Therefore, the P bit is used to easily detect transmission errors and may be used to determine channel reliability.

For more detailed information on the AES-EBU format, refer to "AES Recommended Practice for Digital Audio Engineering-Serial Transmission Format for Linearly Represented Digital Audio Data" published by the Audio Engineering Society in 1985. Similarly, for information concerning the CP-340 format, refer to "EIAJ CP-340 Digital Audio Interface" published by the Standards of Electronic Industries Association of Japan in 1987.

Both the AES-EBU and CP-340 formats are commonly used for transmitting digital audio and non-audio data between a compact disc player, a digital audio tape player, an audio mixing board, studio recording equipment, and consumer musical instruments. Because of the wide applications of the AES-EBU and CP-340 formats for transmission of audio information, it is useful for a digital signal processor to also be compatible with this digital audio format. When transferring digital audio information from a digital audio source, such as a compact disc player or a digital audio tape player, to a digital audio sink, such as a digital signal processor, the digital data is typically provided to an interface transceiver where it is modified to a form in which it may be used by the digital signal processor.

The interface transceiver is typically configured to communicate the digital data in a predetermined format. In some interface transceivers currently being marketed, digital data is both transmitted and received in only one format. With only one format, all digital data is required to have a same number of bits, to be transferred at a same frequency, and to have a same time slot assignment for each of the left and right channels of audio and non-audio data. A system which implements this type of interface transceiver is limited to digital audio sources and sinks which require the implemented format. For example, a serial port of a digital signal processor may be required by the predetermined format, but an Analog to Digital (A/D) converter device would not function correctly with the same transceiver. Therefore, a user of the system must either provide a different interface transceiver for use with the A/D converter device or else not use the A/D converter device.

In some variations of the interface transceiver described above, different time slot lengths may be accommodated. For example, an interface transceiver may support a digital audio sink which has a choice of either sixteen or twenty-four bit wide time slots for digital audio data. The order in which the left and right channels of digital audio data are transferred must generally remain the same. Therefore, an interface transceiver which implements such a feature is limited to a digital audio source or sink which has interfaces to receive the digital audio data in that predetermined order.

In other implementations, the non-audio data is transferred separately from the audio data. Therefore, at least two output pins must be dedicated for transferring each of the audio and non-audio data values. Additionally, the rate of transfer of the non-audio data must remain the same as the sampling frequency of the audio data. The flexibility of the system is, however, still limited by the inability of the interface transceiver to change the format of the data transfer. Because the interface transceiver does not change its format, the possible digital audio sources and sinks are limited to those devices which support the format of the transceiver.

Therefore, a need exists for an interface transceiver which provides greater flexibility to interface with a plurality of digital audio sources and sinks. The interface transceiver should be able to interface with each of the plurality of digital audio sources and sinks with little or no added external glue logic. The user should be provided with a transceiver which is flexible and may be easily implemented.

SUMMARY OF THE INVENTION

The previously mentioned needs are fulfilled with the present invention. Accordingly, there is provided, in one form, a transceiver for communicating a plurality of digital audio data values between a modulated digital audio source and an unmodulated digital audio sink. The transceiver includes a digital audio demodulator for receiving the plurality of digital audio data values from the modulated digital audio source. The digital audio demodulator demodulates the plurality of digital audio data values to provide a plurality of demodulated audio data values in a first format. The transceiver also includes a receive serial interface for receiving the plurality of demodulated audio data values in the first format. The receive serial interface receives a plurality of mode control signals from the unmodulated digital audio sink. The plurality of mode control signals program the receiving serial interface to provide the plurality of demodulated audio data values to the unmodulated digital audio sink in a second format.

These and other features, and advantages, will be more clearly understood from the following detailed description taken in conjunction with the accompanying drawing.

DETAILED DESCRIPTION OF A PREFERRED EMBODIMENT

During a description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

The present invention provides an interface transceiver which allows a variety of digital sources and sinks to communicate a plurality of left and right audio and non-audio components without additional external logic, wherein each of the variety of digital sources and sinks has a different format for either transmitting or receiving digital data. For example, the transceiver may be used to communicate data to both a serial port input of a digital signal processor and from an A/D converter without glue logic. The transceiver also transmits data to a plurality of both modulated and unmodulated digital data sinks such as hard disk drives, digital audio tape recorders, audio mixing boards, and studio recording equipment. Additionally, the transceiver is able to receive data from both modulated and unmodulated digital data sources with minimal external circuitry. For example, the transceiver receives data from a both a compact disc player, a digital signal processor, and even a microcontroller having a read only memory circuit (ROM) without adding additional logic circuitry.

To facilitate the use of the interface transceiver in a variety of systems, a plurality of ports have been provided to allow the transceiver to communicate digital audio and non-audio data in varying formats and at different rates. The varying formats provide data both serially and in parallel depending on the requirements of the digital data source. By communicating data in parallel, an amount of time required to communicate the digital data may be decreased in some formats. For example, digital audio and non-audio data may be transferred in thirty-two, forty-eight, sixty-four, or seventy-two clock cycles. Additionally, digital non-audio data is communicated at different rates depending on the specifications and characteristics of the digital data sources and sinks used in a system. For example, a ROM circuit would require a receiver which transmits the non-audio data at a low frequency whereas a serial port of a digital signal processor would transmit the non-audio data at a much higher frequency. The interface transceiver described herein allows both digital data sources to be used without the addition of external glue logic. The ports are programmed to communicate the digital data in the varying formats through external mode programming pins of the interface transceiver. The mode programming pins are programmed by the user of the interface transceiver.

Figure 1:
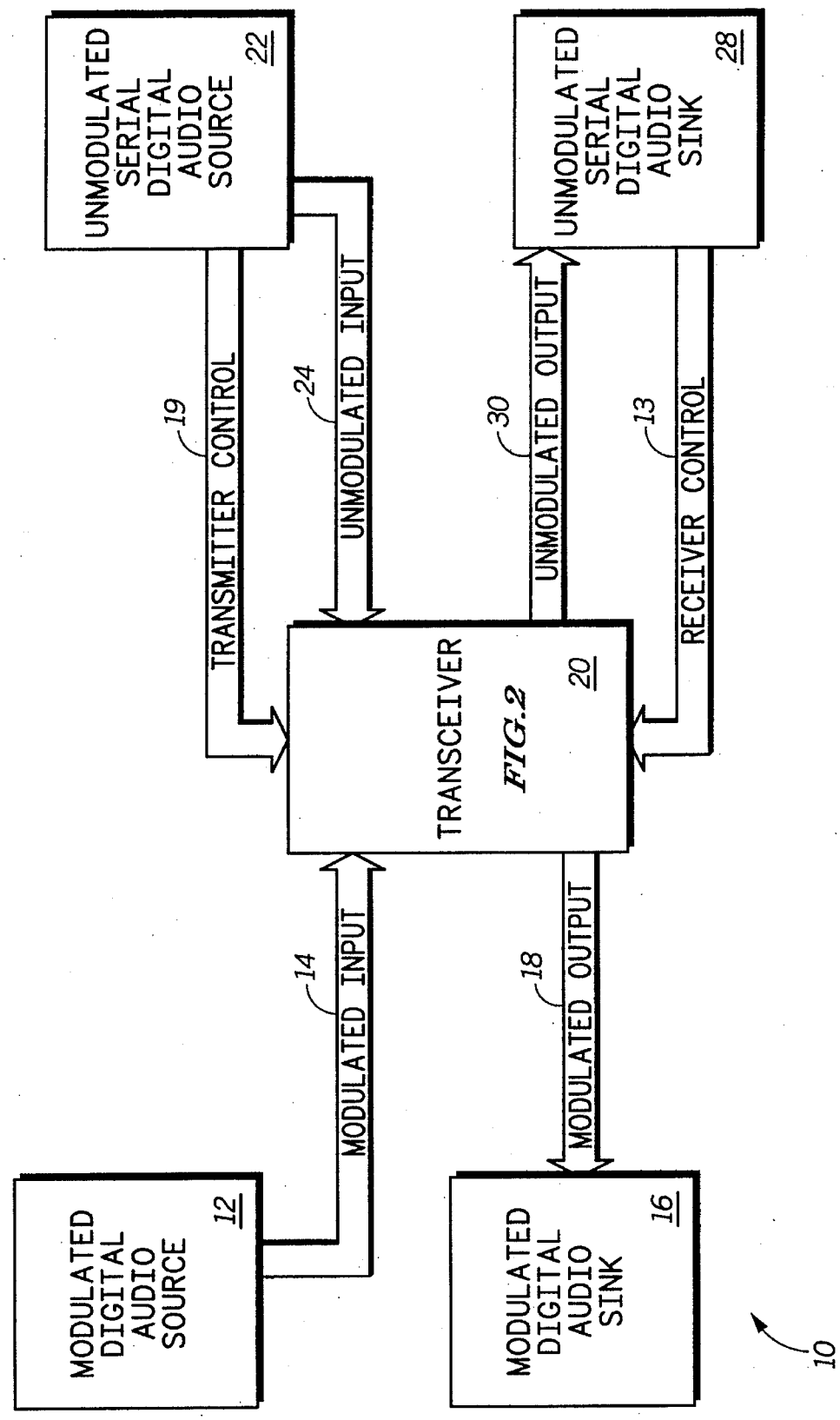
FIG. 1 illustrates in a block diagram form a communications system for transferring digital audio information from a digital audio source to a storage circuit in accordance with the present invention.

FIG. 1 illustrates one implementation of a system in which the invention described above may be used. FIG. 1 illustrates a communications system 10 for communicating digital audio information from a plurality of digital audio sources to a plurality of digital audio sinks. Communications system 10 includes a modulated digital audio source 12, a modulated digital audio sink 16, a transceiver 20, an unmodulated serial digital audio source 22, and an unmodulated serial digital audio sink 28.

In the implementation of the invention described herein, modulated digital audio source 12 may be any digital transmitter such as a compact disc player or a digital audio tape player. Additionally, professional recording equipment may also be used as digital audio source 12. Unmodulated serial digital audio source 22 may be implemented as a digital signal processor. A standard memory circuit such as a ROM might also be implemented to provide non-audio data. An audio mixing board or audio recording equipment may be used to execute the function performed by modulated digital audio sink 16. Similarly, unmodulated serial digital audio sink 28 may be implemented as a hard disk of a computer or a D/A converter.

Modulated digital audio source 12 provides a plurality of modulated digital audio and non-audio input information values to transceiver 20 via a Modulated Input bus 14. The plurality of modulated digital audio and non-audio input information values is provided in a serial format such as CP-340 or AES-EBU. Unmodulated serial digital audio source 22 provides a plurality of unmodulated digital information values to transceiver 20 via an Unmodulated Input bus 24. Control information associated with a transmitter portion of transceiver 20 is communicated via a Transmitter Control bus 19. Transceiver 20 provides a plurality of modulated digital audio and non-audio output information values to modulated digital audio sink 16 via a Modulated Output bus 18. Similarly, transceiver 20 provides a plurality of unmodulated digital output information values to unmodulated serial digital audio sink 28. Unmodulated digital audio sink 28 provides a plurality of control signals for controlling operation of a receiver portion of transceiver 20 via a Receiver Control bus 13.

Figure 2:
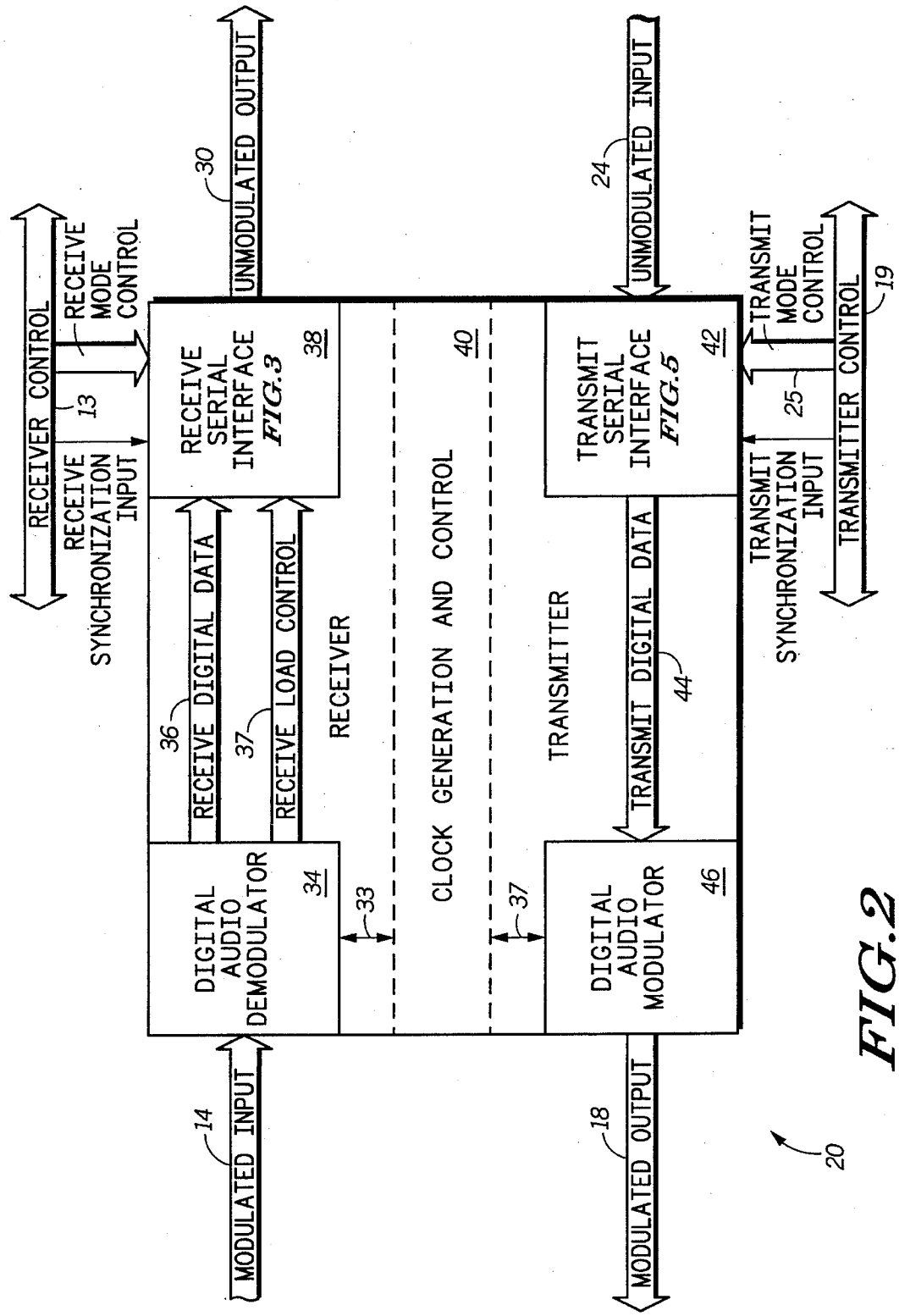
FIG. 2 illustrates in a block diagram form an interface transceiver as illustrated in the communications system of FIG. 1.

Transceiver 20 is illustrated in greater detail in FIG. 2. Transceiver 20 generally includes a digital audio demodulator 34, a receive serial interface 38, a clock generation and control circuit 40, a transmit serial interface 42, and a digital audio modulator 46.

Digital audio demodulator 34 receives a plurality of modulated digital input data information values from modulated digital audio source 12 via Modulated Input bus 14. Additionally, digital audio demodulator 34 is bidirectionally coupled to clock generation and control circuit 40 to communicate clock and timing control information via a first Clock bus 33. Digital audio demodulator 34 is also coupled to receive serial interface 38 via both a Receive Digital Data bus 36 and a Receive Load Control bus 37.

Receive serial interface 38 is also connected to modulated digital audio source 12 to receive a plurality of control signals via Receiver Control bus 13. Receiver Control bus 13 provides a plurality of signals collectively referred to as "Receive Mode Control" and a Receive Synchronization Input (RSI) signal. Additionally, receive serial interface 38 is coupled to unmodulated serial digital audio sink 28 to provide unmodulated digital data information values via Unmodulated Output bus 30. In the implementation of the invention described herein, digital audio demodulator 34, receive serial interface 38, and clock generation and control circuit 40 form a receiver portion of transceiver 20. The receiver circuit receives modulated digital data from modulated digital audio source 12 and provides a modified form of the digital data to unmodulated serial digital audio sink 28.

Figure 3:
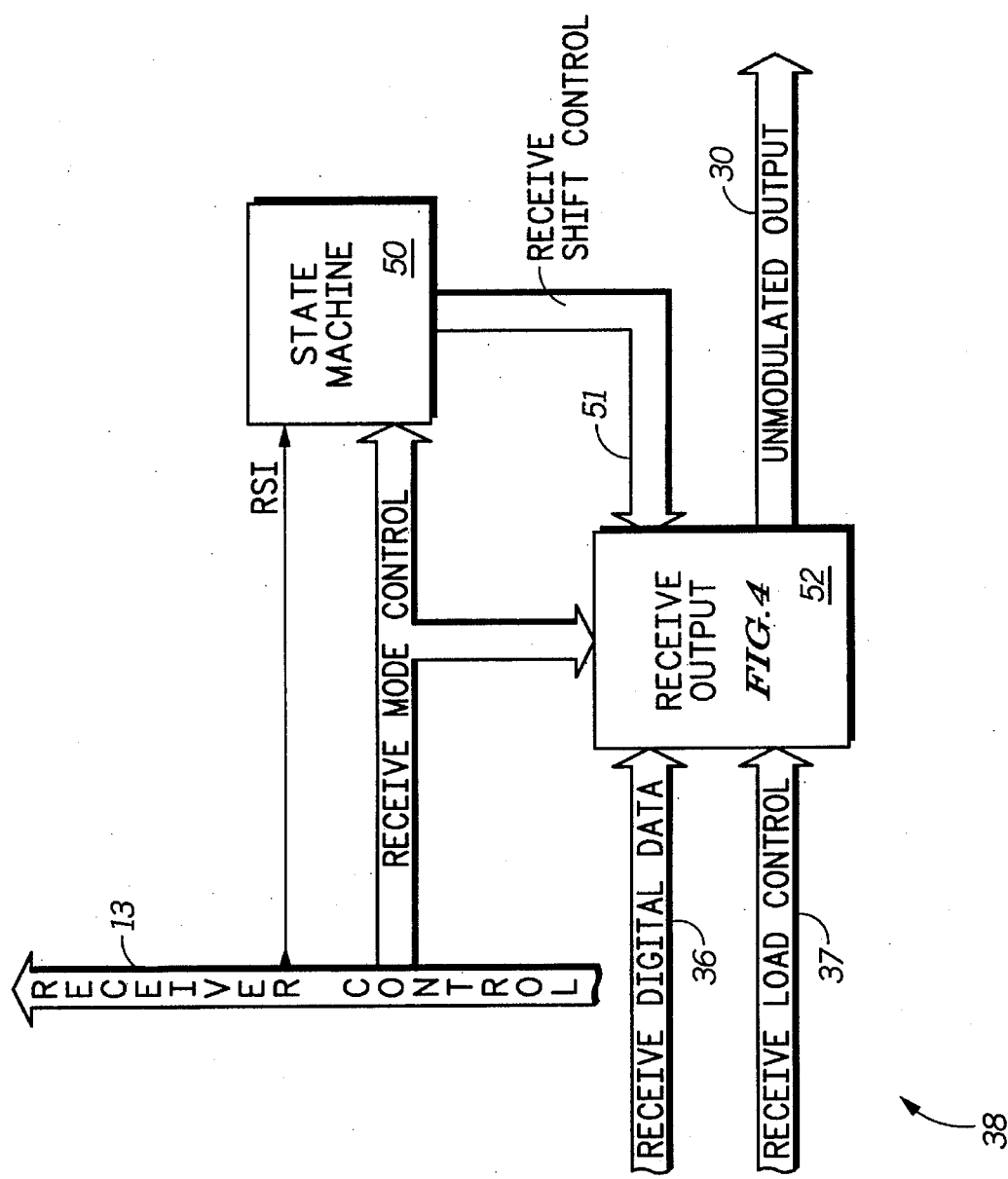
FIG. 3 illustrates in a block diagram form a receive serial interface as illustrated in the communications system of FIG. 1.

Receive serial interface 38 is illustrated in greater detail in FIG. 3. Receive serial interface 38 generally includes a state machine 50 and a serial mode receive output circuit 52. Receive Control bus 13 provides the Receive Synchronization Input signal and the plurality of Receive Mode Control signals to state machine 50. State machine 50 is connected to serial mode receive output circuit 52 via a Receive Shift Control bus 51. Additionally, the plurality of Receive Mode Control signals are provided to serial mode receive output circuit 52.

Serial mode receive output circuit 52 also receives digital audio and non-audio data via Receive Digital Data bus 36 and control and timing information via Receive Load Control bus 37. An output of serial mode receive output circuit 52 is provided to an external audio sink via Unmodulated Output bus 30.

Figure 4:
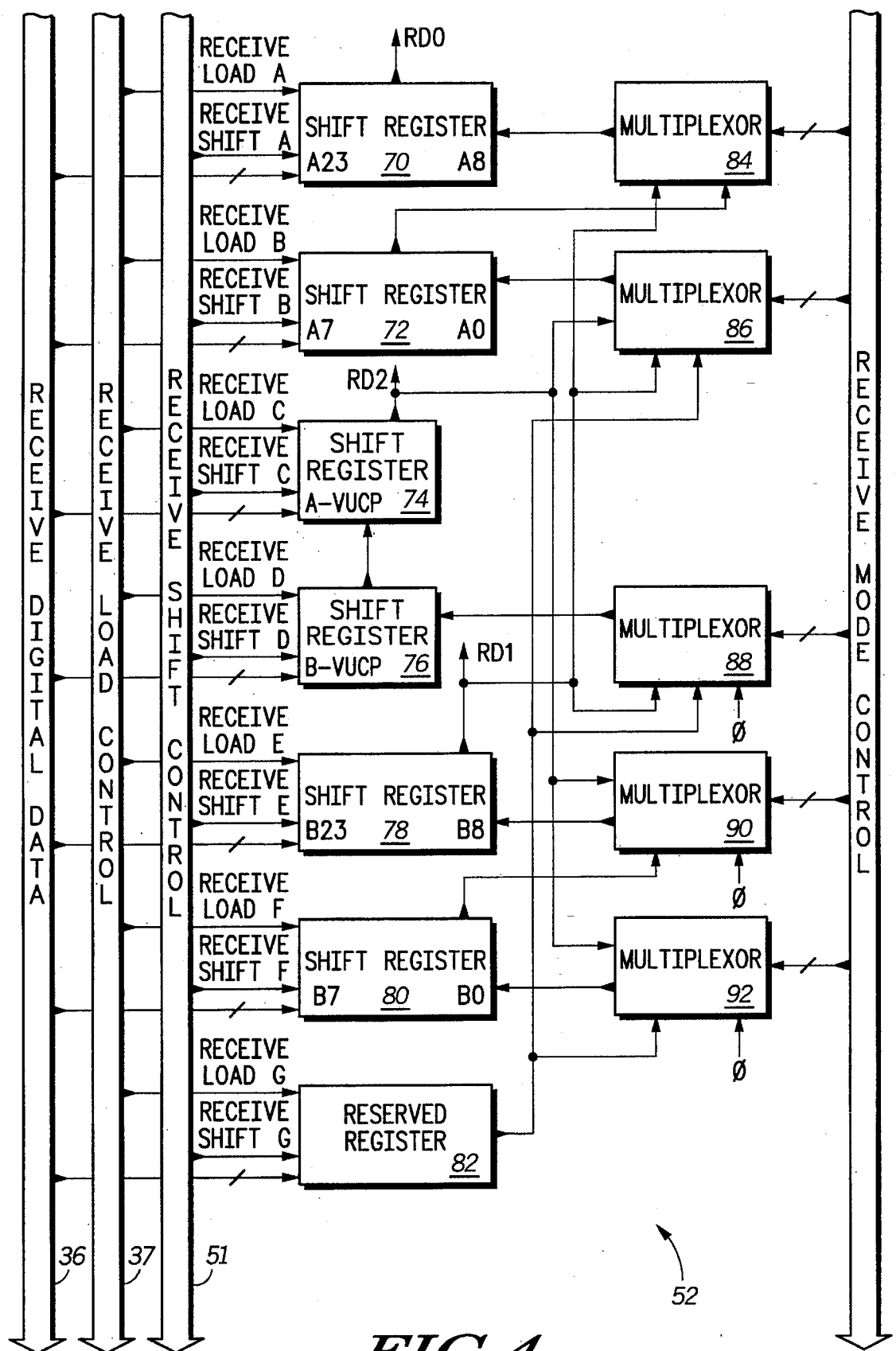
FIG. 4 illustrates in block diagram form a serial mode receive output circuit as illustrated in the receive serial interface of FIG. 3.

Serial mode output circuit 52 is illustrated in greater detail in FIG. 4. Serial mode output circuit 52 generally includes a sixteen bit shift register 70, an eight bit shift register 72, a four bit shift register 74, a four bit shift register 76, a sixteen bit register 78, an eight bit register 80, a reserved register 82, a multiplexor 84, a multiplexor 86, a multiplexor 88, a multiplexor 90, and a multiplexor 92.

Each of the plurality of shift registers, 70, 72, 74, 76, 78, 80, and 82, receive a load control signal via Receive Load Control bus 37. A load control signal which is provided to shift register 70 is labeled "Receive Load A." Similarly, load control signals going to each of shift registers, 72, 72, 76, 78, 80, and 82, are respectively labeled "Receive Load B," "Receive Load C," "Receive Load D," "Receive Load E,", "Receive Load F," and "Receive Load G." Additionally, each of the plurality of shift registers, 70, 72, 74, 76, 78, 80, and 82, receive a shift control signal via Receive Shift Control bus 51. A shift control signal which is provided to shift register 70 is labeled "Receive Shift A." Similarly, shift control signals going to each of shift registers, 72, 72, 76, 78, 80, and 82, are respectively labeled "Receive Shift B," "Receive Shift C," "Receive Shift D," "Receive Shift E,", "Receive Shift F," and "Receive Shift G." Digital data is also provided to each of the plurality of shift registers, 70, 72, 74, 76, 78, 80, and 82 via Receive Digital Data bus 36. In the implementation of the invention described herein, bit twenty-three through bit eight of an A channel of digital audio data are stored in shift register 70. Similarly, bit seven through bit zero of the A channel of digital audio data are stored in shift register 72. An A-channel digital non-audio data value is stored in shift register 74. Similarly, a B-channel digital non-audio data value is stored in shift register 76. Bit twenty-three through bit eight of a B channel of digital audio data are stored in shift register 78. Similarly, bit seven through bit zero of the B channel of digital audio data are stored in shift register 80. Reserved register 82 may be either forty, sixteen, or eight bits depending on an application and is reserved for information. Reserved register 82 receives digital data via Receive Digital Data bus 36. Additionally, the plurality of the Receive Mode Control signals are provided to each of multiplexors 84, 86, 88, 90, and 92.

An output of reserved register 82 is provided to an input of each of multiplexors 92, 90, 88, and 86. An output of multiplexor 92 is provided to shift register 80. An output of shift register 80 is provided to an input of multiplexor 90. An output of multiplexor 90 is provided to shift register 78. Shift register 78 provides a RD1 output to multiplexors 88, 86, and 84. Additionally, the RD1 signal is provided to a digital audio sink 28 via Unmodulated Output bus 30.

An output of multiplexor 88 is provided to an input of shift register 76. An output of shift register 76 is provided to an input of shift register 74. Shift register 74 provides a RD2 signal to multiplexors 86, 90, and 92. Additionally, the RD2 signal is provided to a digital audio sink 28 via Unmodulated Output bus 30. An output of multiplexor 86 is provided to shift register 72. An output of shift register 72 is provided to multiplexor 84. An output of multiplexor 84 is provided to an input of shift register 70. Shift register 70 provides a RD0 signal to digital audio sink 28 via Unmodulated Output bus 30. Operation of receive serial interface 38 will be discussed later in more detail.

Similarly, in this implementation of the invention as illustrated in FIG. 2, clock generation and control circuit 40, transmit serial interface 42, and digital audio modulator 46 form a transmitter circuit for transmitting digital data from unmodulated serial digital audio source 22 to modulated digital audio sink 16. In transceiver 20, transmit serial interface 42 is connected to unmodulated serial digital audio source 22 via Unmodulated Input bus 24 to receive unmodulated serial digital data. Transmit serial interface 42 is also connected to unmodulated serial digital audio source 22 via Transmitter Control bus 19. Transmitter Control bus 19 provides a plurality of signals collectively referred to as "Transmit Mode Control". Additionally, Transmitter Control bus 19 provides a Transmit Synchronization Input (TSI) signal to transmit serial interface 42.

In FIG. 2, digital audio modulator 46 is connected to transmit serial interface 42 via a Transmit Digital Data bus 44, Digital audio modulator 46 is bidirectionally coupled to clock generation and control circuit 40 to communicate clock and control information via a second Clock bus 37. Digital audio modulator 46 provides a modulated digital output in a standard format such as AES-EBU or CP-340 via Modulated Output bus 18.

Figure 5:
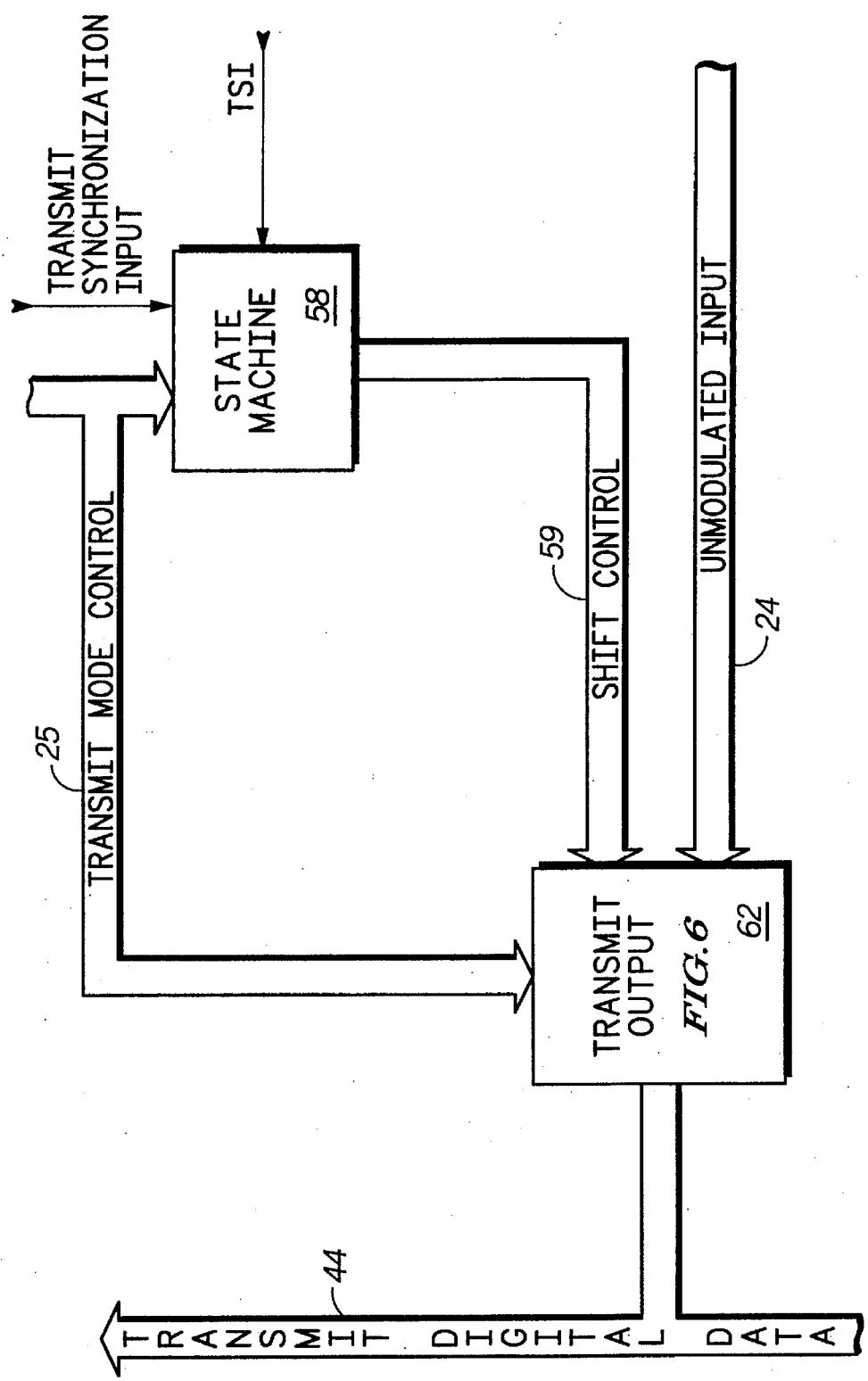
FIG. 5 illustrates in a block diagram form a transmit serial interface as illustrated in the communications system of FIG. 1.

Transmit serial interface 42 is illustrated in greater detail in FIG. 5. Transmit serial interface 42 generally includes a state machine 58 and a serial mode transmit output circuit 62. Transmit Control bus 19 provides the Transmit Synchronization Input signal and the plurality of Transmit Mode Control signals to state machine 58. Additionally, the plurality of Transmit Mode Control signals are provided to serial mode transmit output circuit 62. State machine 58 is connected to serial mode transmit output circuit 62 via a Transmit Shift Control bus 59. Serial mode transmit output circuit 62 also receives digital audio and non-audio data via Unmodulated Input bus 24. An output of serial mode transmit output circuit 62 is provided to digital audio modulator 46 via a Transmit Digital Data bus 44.

Figure 6:
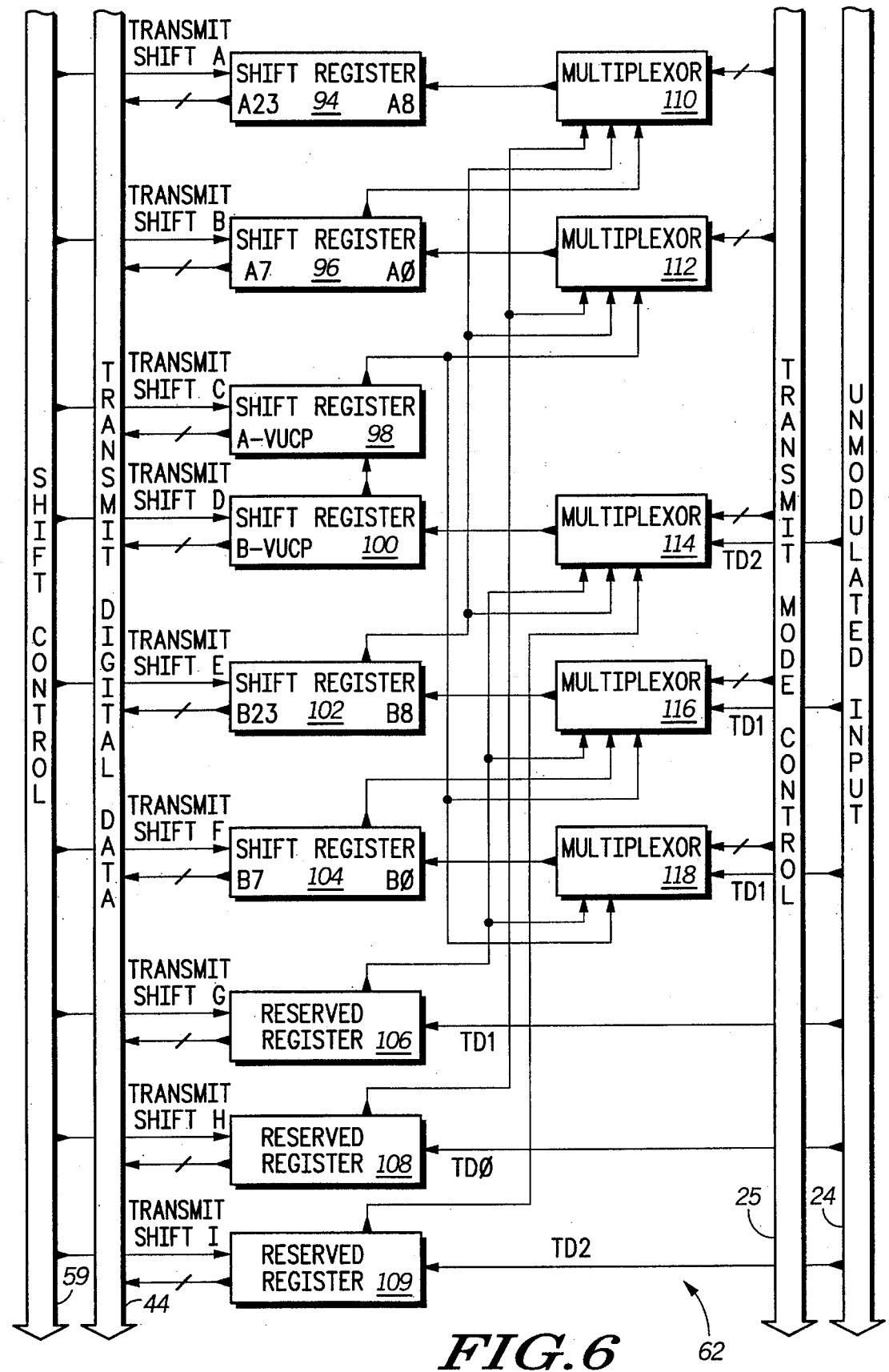
FIG. 6 illustrates in block diagram form a serial mode transmit output circuit as illustrated in the transmit serial interface of FIG. 4.

Serial mode transmit output circuit 62 is illustrated in more detail in FIG. 6. Serial mode transmit output circuit 62 generally includes a sixteen bit shift register 94, an eight bit shift register 96, a four bit shift register 98, a four bit shift register 100, a sixteen bit shift register 102, an eight bit shift register 104, a reserved register 106, a reserved register 108, a reserved register 109, a multiplexor 110, a multiplexor 112, a multiplexor 114, a multiplexor 116, and a multiplexor 118.

Each of the plurality of multiplexors receives the plurality of Transmit Mode Control signals to enable serial mode transmit output circuit 62 to receive digital data in one of a plurality of modes of operation. Additionally, a first digital data stream labeled "TD0" is provided to an input of shift register 108. A second digital data stream labeled "TD1" is provided to an input of multiplexor 116, multiplexor 118, and shift register 106 via Unmodulated Input bus 24. Similarly, a third digital data stream labeled "TD2" is provided to an input of multiplexor 114 and an input of reserved register 109 via Unmodulated Input bus 24. A shift control is provided to each of the plurality of shift registers, 94, 96, 98, 100, 102, 104, 106, 108, and 109, to control shifting and processing of the data stored therein. A shift control signal provided to shift register 94 is labeled "Receive Shift A." Similarly, shift control signals provided to each of shift registers, 96, 98, 100, 102, 104, 106, 108, and 109, are respectively labeled "Receive Shift B," "Receive Shift C," "Receive Shift D," "Receive Shift E," "Receive Shift F," "Receive Shift G," "Receive Shift H," and "Receive Shift I."

In the implementation of the invention described herein, bit twenty-three through bit eight of an A channel of digital audio data are stored in shift register 94. Assume in this example that the A channel of digital audio data is a left channel of digital audio data. Similarly, bit seven through bit zero of the A channel of digital audio data are stored in shift register 96. An A-channel digital non-audio data value is stored in shift register 98. Similarly, a B-channel digital non-audio data value is stored in shift register 100. Assume in this example that the B channel of digital audio data is a right channel of digital audio data. Bits twenty-three through eight of a B channel of digital audio data are stored in shift register 102. Similarly, bit seven through bit zero of the B channel of digital audio data are stored in shift register 104. Reserved register 106 may be either forty, sixteen, or eight bits depending on an application and is reserved for use by the user of transceiver 20. Reserved register 108 may be either sixteen or eight bits depending on an application. Reserved register 108 is reserved for use for the user of transceiver 20.

In serial mode transmit output circuit 62, an output of reserved register 108 is provided to an input of each of multiplexors 110 and 112. An output of reserved register 106 is provided to an input of each of multiplexors 114, 116, and 118. An output of multiplexor 118 is provided to shift register 104. An output of shift register 104 is provided to an input of multiplexor 116. An output of multiplexor 116 is provided to shift register 102. Shift register 102 provides an output to multiplexors 110, 112, and 114.

An output of multiplexor 114 is provided to an input of both shift register 100. An output of shift register 100 is provided to an input of shift register 98. Shift register 98 provides a signal to multiplexors 112, 116, and 118. An output of multiplexor 112 is provided to shift register 96. An output of shift register 96 is provided to multiplexor 110. An output of multiplexor 110 is provided to an input of shift register 94. Operation of transmit serial interface 62 will be discussed later in more detail.

During operation of transceiver 20, Clock generation and control circuit 40 provides the receiver and transmitter sections of transceiver 20 with either independent, asynchronous clocks or the same clock signal. Additionally, receive serial interface 38 is clocked either synchronously or asynchronously with digital audio demodulator 34. Similarly, transmit serial interface 42 is clocked either synchronously or asynchronously with digital audio modulator 46.

Additionally, during operation of transceiver 20, digital audio demodulator 34 receives a plurality of modulated serial digital audio and non-audio data values in a standard format, such as AES-EBU or CP-340, via Modulated Input bus 14. Digital audio demodulator 34 has an internal phase lock loop circuit (not shown) which is used to recover a bit clock using edges which delineate from the modulated serial digital audio and non-audio data values. Digital audio demodulator 34 also detects preamble synchronization patterns, parity errors, and CRC errors which are provided during transmission of the digital audio data in either of the AES-EBU or CP-340 formats. In this implementation of the invention, digital audio demodulator 34 separates the digital audio data from the non-audio data for subsequent processing by receive serial interface 38. Both of the audio and non-audio data values are converted to a most significant bit (MSB) first format and transferred in parallel to receive serial interface 38 one per frame via Receive Digital Data bus 36. Digital audio demodulator 34 also transfers control signals to receive serial interface 38 via Receive Load Control bus 37. The control signals determine when data transferred via Receive Digital Data bus 36 should be processed in receiver serial interface 38.

In addition to the digital data received via Receive Digital Data bus 36 and the timing and control signals received via Receive Load Control bus 37, transceiver 20 also receives a plurality of receive mode control signals via the plurality of Receive Mode Control signals. The plurality of Receive Mode Control signals allow the receiver portion of transceiver 20 to receive digital data in a predetermined serial mode. In the example described herein, eight different receive modes are selected by allowing a user to access programming pins of transceiver 20. The user may program transceiver 20 by providing the proper mode control signals from unmodulated serial digital audio sink 28 via Receiver Control bus 13. Each of the data formats enables transceiver 20 to interface with a variety of digital audio sinks with no glue logic. The data formats include interface options which support sixteen or twenty-four bit wide audio samples, fast or slow non-audio data, and time multiplexed, serial networks with sixteen, twenty-four, or thirty-two bit cycles per time slot. Additionally, an order in which the audio and non-audio data is transferred may be modified in accordance with the specifications of a digital audio sink.

Operation of transceiver 20 is not limited to receiving digital audio data, however. Transceiver 20 also has a transmitter section which is equally as flexible as the receiver section. The transmitter section of transceiver 20 is able to transmit digital audio data in several different formats without additional circuitry or software control.

Referring again to FIG. 2, unmodulated digital data is provided to the transmitter section of transceiver 20 to be processed to form a digital data stream which is transmitted in a predetermined format such as AES-EBU or CP-340. In addition to digital data, unmodulated serial digital audio source 22 also provides control information via a Transmitter Control bus 19 to enable the transmitter portion of transceiver 20 to operate in a mode which best interfaces with unmodulated serial digital audio source 22.

In the example described herein, eight different transmit modes are selected by allowing a user to access programming pins of transceiver 20. The user may program transceiver 20 by providing the proper mode control signals from unmodulated serial digital audio source 22 via Transmitter Control bus 19. Each of the data formats enables transceiver 20 to interface with a variety of digital audio sources with no glue logic. The data formats include interface options which support sixteen or twenty-four bit wide audio samples, fast or slow non-audio data, and time multiplexed, serial networks with sixteen, twenty-four, or thirty-two bit clock cycles per time slot.

Transmit serial interface 42 provides serial inputs for receiving digital data via both Unmodulated Input bus 24 and Transmitter Control bus 19. When the digital data has been processed, the data is transferred in parallel at a predetermined time interval to digital audio modulator 46 via Transmit Digital Data bus 44.

Digital audio modulator 46 receives the buffered digital data and provides a serial data output which is in a standard format which is compatible with the AES-EBU and CP-340 digital audio transmission standards. The serial data output is provided to modulated digital audio sink 16 via Modulated Output bus 18. Digital audio modulator 46 generates preambles, parity and CRC check byte information which are added to a frame of a digital sample received from transmit serial interface 42.

During operation of the receiver portion of transceiver 20, a user of communications system 10 programs the mode control pins such that transceiver 20 communicates digital audio and non-audio data in one of a plurality of possible serial receive modes. The programmed mode control pins are transferred as the plurality of Receive Mode Control signals and are provided to state machine 50. Additionally, digital audio sink 28 provides the Receive Synchronization Input signal to transceiver 20 via Receiver Control bus 13. The Receive Synchronization Input signal is asserted for one clock period to enable transceiver 20 to initiate a receive data transfer. Additionally, state machine 50 uses both the Receive Synchronization Input signal and the plurality of Receive Mode Control signals to determine the timing for operation of receive output circuit 52.

In response to the Receive Synchronization Input signal and the plurality of Receive Mode Control signals, state machine 50 provides a plurality of shift control signals via Receive Shift Control bus 51. A respective one of the plurality of shift control signals is provided to at least one of the plurality of shift registers, 70, 72, 74, 76, 78, 80, and 82, to control timing and speed of a shift operation. For example, in addition to determining when data should be shifted, the shift control signals also indicate how fast the data should be shifted out of the plurality of shift registers.

Additionally, Receive Digital Data bus 36 provides the digital data to be shifted to a predetermined one of the plurality of shift registers, 70, 72, 74, 76, 78, 80, and 82. As was previously described, bit twenty-three through bit eight of an A channel of digital audio data are stored in shift register 70. Similarly, bit seven through bit zero of the A channel of digital audio data are stored in shift register 72. An A-channel digital non-audio data value is stored in shift register 74. Similarly, a B-channel digital non-audio data value is stored in shift register 76. Bit twenty-three through bit eight of a B channel of digital audio data are stored in shift register 78. Similarly, bit seven through bit zero of the B channel of digital audio data are stored in shift register 80. Reserved register 82 may be either forty, sixteen, or eight bits depending on an application and is reserved for information.

A load control signal provided by Receive Load Control bus 37 is provided to each of the plurality of shift registers, 70, 72, 74, 76, 78, 80, and 82, to control when the appropriate data values should be stored in each of the plurality of shift registers. When the load control signal of a shift register is asserted, the shift register is enabled to store data currently provided via Receive Digital Data bus 36.

The plurality of Receive Mode Control signals are provided to a respective one of the plurality of multiplexors 84, 86, 88, 90, and 92, to indicate which serial mode in which a digital audio data value should be transferred.

During operation of the implementation of the invention described herein, eight possible formats may be used to serially transfer the digital audio and non-audio data. Each of the eight possible formats is illustrated in a respective one of FIGS. 7 through 14.

Figure 7:
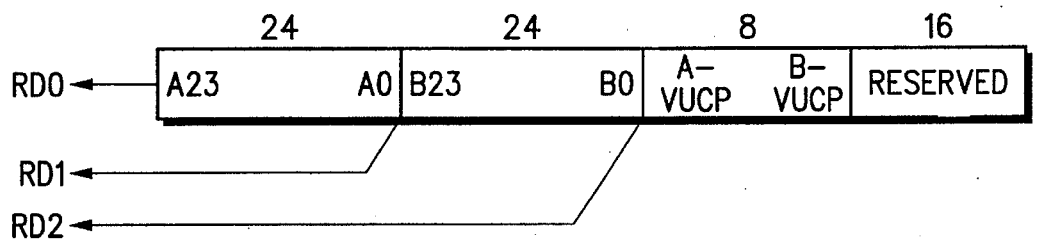
FIG. 7 illustrates in block diagram form a Mode 0 serial receive output mode.

In FIG. 7, a first format referred to as "Mode 0" is illustrated. In Mode 0, digital audio and non-audio data having a data size of twenty-four bits is transferred in three time slots, where each time slot transfers twenty-four bits. When transceiver 20 is operating in serial receive Mode 0, a first twenty-four bits of the A channel of digital audio data is transferred via the RD0 signal. A second twenty-four bits of the B channel of digital audio data are transferred via both the RD0 and RD1 signals at different points in time. Eight bits of digital non-audio information is then transferred via each of the RD0, the RD1, and the RD2 signals. Again, the non-audio information is transferred via each of the RD0, RD1, and RD2 signals at different points in time. A last sixteen bits is concatenated with the eight bits of digital non-audio information such that twenty-four bits is transferred.

During operation, Mode 0 is executed by providing mode control signals to enable each of the plurality of shift registers, 70, 72, 74, 76, 78, 80, and 82. Additionally, Receive Shift Control bus 52 must provide the plurality of shift control signals having the proper timing and control information to shift the contents of each of the plurality of registers at a certain point in time. Therefore, the Receive Shift A control signal is provided to enable shift register 70 to provide bits twenty-three through eight of an A channel of digital audio data to digital audio sink 28 via the RD0 signal. Concurrently, bits seven through zero of the A channel of digital audio data are transferred to multiplexor 84 as the Receive Shift B control signal is asserted. The plurality of Receive Mode Control signals collectively enables multiplexor 84 to provide bits seven through zero of the A channel digital audio data to shift register 70. Bits seven through zero are concatenated to bits twenty-three through eight and are shifted to digital audio sink 28 via the RD0 signal during a first twenty-four bit time slot. Again, the Receive Shift A signal is asserted to enable shift register 70 to shift bits seven through zero.

Bits twenty-three through eight of the B channel of digital audio data are shifted from shift register 78 to multiplexor 86 in response to assertion of the Receive Shift E signal. Bits twenty-three through eight of the B channel digital data are concurrently provided to an audio sink via Unmodulated Output bus 30. The plurality of Receive Mode Control signals enables multiplexor 86 to provide the B channel digital audio data to shift register 72. Upon receipt of the Receive Shift B signal, shift register 72 provides bit twenty-three through eight of the B channel digital data to multiplexor 84. Multiplexor 84 is enabled by the plurality of Receive Mode Control signals to provide bits twenty-three through eight of B channel digital audio data to shift register 70. B channel audio data bits twenty-three through eight are shifted out of shift register 70 in the next twenty-four bit time slot following the transfer of bits twenty-three through zero of the A channel of digital audio information. B channel bits seven through zero are shifted out of shift register 80 to multiplexor 90. Again, the plurality of Receive Mode Control signals enables multiplexor 90 to provide bits seven through zero of the B channel audio data to shift register 78. Shift register 78 transfers bits seven through zero of the B channel audio data to multiplexor 86 in response to the Receive Shift E signal. The plurality of Receive Mode Control signals enable multiplexor 86 to provide bits seven through zero of the B channel audio data to shift register 72. Shift register 72 provides the B channel digital audio data to multiplexor 84 upon receive of the Receive Shift B signal. Multiplexor 84 provides bits seven through zero of the B channel digital audio data to shift register 70 upon receipt of the plurality of Receive Mode Control signals. Shift register 70 shifts bits seven through zero of the B channel digital audio data to digital audio sink 28 via the RD0 signal in response to the Receive Shift A control signal. Bits seven through zero are concatenated with bits twenty-three through eight and are transferred in the second twenty-four bit time slot.

Channel A non-audio digital data is shifted from shift register 74 to multiplexor 92 in response to the Receive Shift C control signal provided via Receive Shift Control bus 51. The Channel A digital non-audio data is also provided to an audio sink via the RD2 signal. The plurality of Receive Mode Control signals enables multiplexor 92 to provide the channel A non-audio data to shift register 80. Concurrently, non-audio data associated with Channel B digital data is shifted from shift register 76 to shift register 74 in response to the Receive Shift D Control signal. Shift register 74 shifts the B channel non-audio data to multiplexor 92. The Channel B non-audio data is also provided to the audio sink via the RD2 signal. Again, multiplexor 92 is enabled to provide B channel digital non-audio data to shift register 80 such that the B channel non-audio data is concatenated with the A channel non-audio data. Shift register 80 is enabled by the Receive Shift F Control signal to provide the concatenated A and B channel non-audio data to multiplexor 90. Again, the plurality of Receive Mode Control signals enables multiplexor 90 to provide the contents of shift register 80 to shift register 78. Shift register 78 shifts the concatenated non-audio data to multiplexor 86 when the Receive Shift E signal is asserted. The plurality of Receive Mode Control signals enables multiplexor 86 to provide the non-audio data to shift register 72. Shift register 72 is enabled by the Receive Shift D control signal to provide the concatenated A and B channel non-audio data to multiplexor 84. Again, the plurality of Receive Mode Control signals enables multiplexor 84 to provide the contents of shift register 72 to shift register 70. Shift register 70 shifts output the digital non-audio data in a third twenty-four bit time slot via the RD0 signal.

The contents of reserved register 82 are transferred in a remaining sixteen bits of the third twenty-four bit time slot. The Receive Shift G Control signal enables reserved register 82 to provide a reserved data value to multiplexor 88. The plurality of Receive Mode Control signals then enables multiplexor 88 to provide the contents of reserved register 82 to shift register 76. Shift register 76 shifts the reserved data value to shift register 74. When enabled by the Receive Shift C signal, shift register 74 provides the reserved data value to multiplexor 92. The plurality of Receive Mode Control signals enable multiplexor 92 to provide its contents to shift register 80. Shift register 80 shifts the reserved data value to multiplexor 90. Multiplexor 90 provides the reserved data value to shift register 78 when enabled by the plurality of Receive Mode Control signals. Shift register 78 transfers the reserved data value to multiplexor 86 when the Receive Shift E signal is asserted. When enabled by the plurality of Receive Mode control signals, multiplexor 86 provides the reserved data value to shift register 72. Shift register 72 shifts the data to multiplexor 84 when the Receive Shift B signal is asserted. When enabled by the plurality of Receive Mode Control signals, multiplexor 84 provides the reserved data value to shift register 70. Shift register 70 provides the reserved data value to digital audio sink 28 via the RD0 signal when the Receive Shift A Control signal is asserted to enable shift register 70. The last sixteen bits of the third time slot are filled with the reserved data value.

Note, in Mode 0, the non-audio information is transferred at the same rate as the audio information. Three twenty-four bit time slots are required to provide all of the digital audio and non-audio information. Mode 0 is useful in twenty-four bit professional audio applications requiring a digital audio sink which is implemented as a twenty-four bit DSP56001, a digital signal processor currently available from Motorola, Inc. of Austin, Tex.

Figure 8:
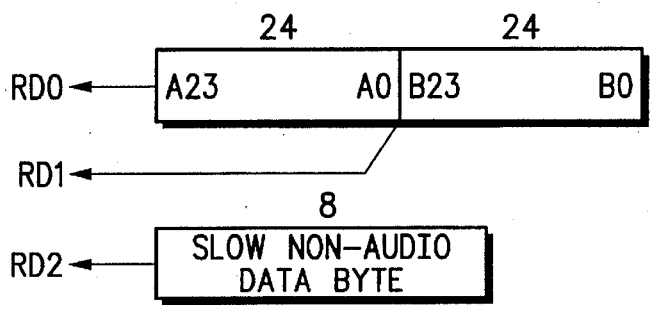
FIG. 8 illustrates in block diagram form a Mode 1 serial receive output mode.

A second format referred to as "Mode 1" is illustrated in FIG. 8. In Mode 1, digital audio data having a data size of twenty-four bits and digital non-audio data having a data size of eight bits is concurrently transferred using two time slots, where each time slot transfers twenty-four bits. When transceiver 20 is operating in serial receive Mode 1, a first twenty-four bits, the A channel of digital audio data, are transferred via the RD0 signal. A second twenty-four bits, the B channel of digital audio data, are also transferred via the RD0 signal. Eight bits of digital non-audio information are concurrently transferred in parallel to the A and B channels of audio information via the RD2 signal. The non-audio data is provided at a slower rate than the left and right channels of the audio information.

During operation, Mode 1 is executed by providing the plurality of mode control signals to enable each of the plurality of shift registers, 70, 72, 74, 76, 78, 80, and 82, to provide digital data in the Mode 1 format. The Receive Shift A Control signal is provided to enable shift register 70 to provide bits twenty-three through eight of the A channel digital audio data to digital audio sink 28 via the RD0 signal. Concurrently, bits seven through zero of the A channel digital audio data are transferred to multiplexor 84. The plurality of Receive Mode Control signals enables multiplexor 84 to provide bits seven through zero of the A channel digital audio data to shift register 70. Bits seven through zero are concatenated with bits twenty-three through eight and are shifted to digital audio sink 28 via the RD0 signal during a first twenty-four bit time slot.

Bits twenty-three through eight of the B channel of digital audio data are shifted from shift register 78 to multiplexor 86. The plurality of Receive Mode Control signals enables multiplexor 86 to provide the contents of shift register 78 to shift register 72. Shift register 72 shifts the B channel digital audio data to multiplexor 84. Multiplexor 84 provides the digital audio data to shift register 70. When enabled by the Receive Shift A signal, shift register 70 shifts bits twenty-three through eight out in the next twenty-four bit time slot following the transfer of bits twenty-three through zero of the A channel of digital audio information. Bits seven through zero are then shifted out of shift register 80 to multiplexor 90. One of the plurality of Receive Mode Control signals enables multiplexor 90 to provide the contents of shift register 80 to shift register 78. Shift register 78 transfers the former contents of shift register 80 to multiplexor 86. Multiplexor 86 subsequently provides bits seven through zero of the B channel digital audio data to shift register 72 upon receipt of one of the plurality of Receive Mode Control signals. Shift register 72 provides bits seven through zero of the B channel digital audio data to multiplexor 84 upon assertion of the Receive Shift B signal. Multiplexor 84 subsequently provides bits seven through zero of the B channel digital audio data to shift register 70. Shift register 70 shifts bits seven through zero of the B channel digital audio data to digital audio sink 28 via the RD0 signal in response to the Receive Shift A Control signal. Bits seven through zero are concatenated with bits twenty-three through eight and are transferred in the second twenty-four bit time slot.

Concurrently, non-audio data associated with Channel A digital data is shifted from shift register 74 to digital audio sink 28 via the RD2 signal. Shift register 74 shifts the Channel A non-audio data at a slow rate determined by the Receive Shift C Control signal. Non-audio data associated with Channel B digital data is concurrently shifted from shift register 76 to shift register 74 in response to the Receive Shift D Control signal provided via Receive Shift Control bus 51. Shift register 74 then shifts the B channel non-audio data to digital audio sink 28 via the RD2 signal. Again, shift register 74 shifts the Channel B non-audio data at a slow rate determined by the Receive Shift C Control signal.

In Mode 1, each of the plurality of shift registers, 70, 72, 78, and 80, are concatenated, in that order, to form a single large shift register. The plurality of Receive Mode Control signals enable each of the plurality of multiplexors, 84, 86, 90, and 92, to configure the plurality of shift registers in this manner. Additionally, a mode of operation indicated by the plurality of Receive Mode control signals does not typically change during operation of communications system 10.

Like Mode 0, Mode 1 is useful in twenty-four bit professional audio applications requiring a digital audio sink which is implemented as a twenty-four bit DSP56001, a digital signal processor currently available from Motorola, Inc. of Austin, Tex. Additionally, Mode 1 would be useful in applications using a digital audio sink with a twenty-four bit I²S interface.

Figure 9:
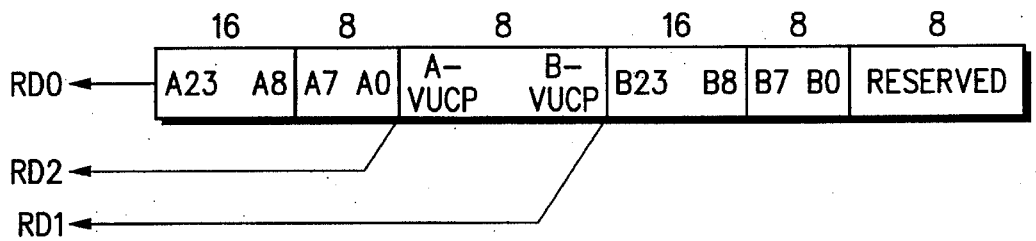
FIG. 9 illustrates in block diagram form a Mode 2 serial receive output mode.

A third format referred to as "Mode 2" is illustrated in FIG. 9. In Mode 2, digital audio and non-audio data having a data size of twenty-four bits is transferred in four time slots, where each time slot transfers sixteen bits. When transceiver 20 is operating in serial receive Mode 2, bits twenty-three through eight of the A channel of digital audio data are transferred in a first time slot. In a second time slot, bits seven through zero of the A channel of digital audio data are concatenated with the eight bits of digital non-audio data associated with both channel A and channel B. Bits twenty-three through eight of the B channel of digital data are transferred during a third time slot. During a fourth time slot, an eight bit reserved data value is concatenated with bits seven through zero of the B channel of digital data and both data values are subsequently transferred.

During operation in Mode 2, the Receive Shift A Control signal is asserted to enable shift register 70 to provide bits twenty-three through eight of an A channel of digital audio data to digital audio sink 28 via the RD0 signal. Bits twenty-three through eight of the A channel of digital audio data are provided in a first sixteen bit time slot.

Bits seven through zero of the A channel of digital audio data are transferred to multiplexor 84. The plurality of Receive Mode Control signals enables multiplexor 84 to provide bits seven through zero of the A channel digital audio data to shift register 70. Bits seven through zero are shifted to digital audio sink 28 via the RD0 signal during a first portion of the second sixteen bit time slot. Non-audio data associated with Channel A digital data is shifted from shift register 74 to both multiplexor 86 and an audio sink in response to the Receive Shift C Control signal. The non-audio data is provided to the audio sink via Unmodulated Output bus 30. The plurality of Receive Mode Control signals enables multiplexor 86 to provide the digital non-audio data to shift register 72. Concurrently, non-audio data associated with Channel B digital data is shifted from shift register 76 to shift register 74 in response to the Receive Shift D Control signal. Shift register 74 shifts the B channel non-audio data to both multiplexor 86 and the audio sink. Again, the non-audio data is provided to the audio sink via Unmodulated Output bus 30. Additionally, multiplexor 86 is enabled to provide B channel digital non-audio data to shift register 72 such that the B channel non-audio data is concatenated with the A channel non-audio data. Shift register 72 is enabled by the Receive Shift B Control signals provided by Receive Shift Control bus 52 to provide the concatenated A and B channel non-audio data to multiplexor 84. The plurality of Receive Mode Control signals again enables multiplexor 84 to provide the contents of shift register 72 to shift register 70. Shift register 70 shifts out the digital non-audio data in a second portion of the second sixteen bit time slot via the RD0 signal.

Subsequently, bits twenty-three through eight of the B channel of digital audio data are shifted from shift register 78 to multiplexor 88. The plurality of Receive Mode Control signals enables multiplexor 88 to provide the contents of shift register 78 to shift register 76. When the Receive Shift D signal is asserted, shift register 76 provides the B channel data to shift register 74. Shift register 74 provides bits twenty-three through eight of the B channel of digital audio data to both an external sink via the RD2 signal and multiplexor 86. When enabled by the plurality of Receive Mode Control signals, multiplexor 86 provides the channel B information to shift register 72. Shift register 72 transfers the digital data to multiplexor 84 when the Receive Shift B signal is asserted. Multiplexor 84 provides the channel B digital audio data to shift register 70. The Receive Shift A signal is provided to shift register 70 to shift bits twenty-three through eight of the B channel out via the RD0 signal in the next sixteen bit time slot following the transfer of the non-audio digital data.

Bits seven through zero of the B channel of digital audio data are shifted out of shift register 80 to multiplexor 90. Again, one of the plurality of Receive Mode Control signals enables multiplexor 90 to provide the contents of shift register 80 to shift register 78. Shift register 78 then transfers the former contents of shift register 80 to multiplexor 88. In response to the plurality of Receive Mode Control signals, multiplexor 88 provides channel B bits seven through zero to shift register 76. Shift register 76 subsequently provides the information to shift register 74 upon receipt of the Receive Shift D signal. Shift register 74 provides bits seven through zero of the B channel digital audio data to multiplexor 86 upon receipt of the Receive Shift C signal. Multiplexor 86 provides the information to shift register 72 in response to the plurality of Receive Mode Control signals. Shift register 72 provides bits seven through zero of the B channel digital audio data to multiplexor 84 upon assertion of the Receive Load B signal. Multiplexor 84 provides bits seven through zero of the B channel digital audio data to shift register 70 upon receipt of the plurality of Receive Mode Control signals. Shift register 70 shifts bits seven through zero of the B channel digital audio data to digital audio sink 28 via the RD0 signal in response to the Receive Shift A Control signal. Bits seven through zero are transferred in a first portion of a fourth sixteen bit time slot.

Eight bits of the contents of reserved register 82 are transferred in a remaining eight bits of the fourth sixteen bit time slot. The Receive Shift E Control signal enables reserved register 82 to provide a reserved data value to multiplexor 92. Multiplexor 92 provides the reserved data value to shift register 80. Shift register 80 then provides the reserved data value to multiplexor 90 when the Load F signal is asserted. Multiplexor 90 provides the reserved data value to shift register 78. Upon assertion of the Receive Shift E signal, shift register 78 provides the reserved data value to both multiplexor 88 and to an external audio and non-audio sink via the RD1 signal. Multiplexor 88 provides the reserved data value to shift register 76. Shift register 76 then provides the reserved data value to shift register 74 when the Receive Shift D signal is asserted. When the Receive Shift C signal is asserted, shift register 74 provides the reserved data to both an external audio sink via the RD2 signal and multiplexor 86. Multiplexor 86 is enabled to provide the original contents of reserved register 82 to shift register 72. Shift register 72 shifts the reserved data value to multiplexor 84. When enabled by the plurality of Receive Mode Control signals, multiplexor 84 provides the reserved data value to shift register 70. Shift register 70 provides the reserved data value to digital audio sink 28 via the RD0 signal when a Receive Shift A Control signal is asserted to enable shift register 70.

In Mode 2, each of the plurality of shift registers, 70, 72, 74, 76, 78, 80, and 82, are concatenated, in that order, to form a single large shift register. The plurality of Receive Mode Control signals enable each of the plurality of multiplexors, 84, 86, 88, 90, and 92, to configure the plurality of shift registers in this manner. Additionally, a mode of operation indicated by the plurality of Receive Mode control signals does not typically change during operation of communications system 10.

Note, in Mode 2, the non-audio information is transferred at the same rate as the audio information and four sixteen bit time slots are required to provide all of the digital audio and non-audio information. Mode 2 is useful in sixteen bit professional audio applications requiring a digital audio sink which is implemented as a twenty-four bit DSP56156, a digital signal processor currently available from Motorola, Inc. of Austin, Tex.

Figure 10:
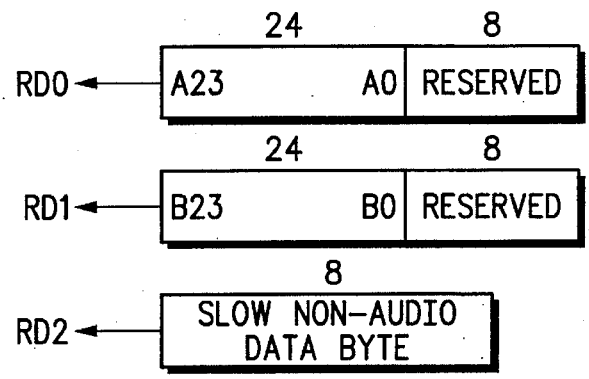
FIG. 10 illustrates in block diagram form a Mode 3 serial receive output mode.

A fourth format referred to as "Mode 3" is illustrated in FIG. 10. In Mode 3, digital audio data having a data size of twenty-four bits and digital non-audio data having a data size of eight bits is concurrently transferred using two time slots, where each time slot transfers twenty-four bits. When transceiver 20 is operating in serial receive Mode 3, a first twenty-four bits, the A channel of digital audio data, are transferred via the RD0 signal. Eight bits of a reserved data value are concatenated with the channel A digital audio value and are also transferred via the RD0 signal. A second twenty-four bits, the B channel of digital audio data, are concurrently transferred via the RD1 signal. Again, eight bits of a reserved data value are concatenated with the channel B digital audio value and are also transferred via the RD1 signal. Eight bits of digital non-audio information are then transferred in parallel to the A and B channels of audio information via the RD2 signal. The non-audio data is provided at a slower rate than the A and B channels of the audio information.

During a Mode 3 operation, a Receive Shift A Control signal is provided to enable shift register 70 to provide bits twenty-three through eight of an A channel of digital audio data to digital audio sink 28 via the RD0 signal. Bits seven through zero of the A channel of digital audio data are transferred to multiplexor 84. The plurality of Receive Mode Control signals enables multiplexor 84 to provide bits seven through zero of the A channel digital audio data to shift register 70. Bits seven through zero are concatenated to bits twenty-three through eight and are shifted to digital audio sink 28 via the RD0 signal during a first twenty-four bit time slot.

Eight bits of the contents of reserved register 82 are then concatenated with the Channel A digital audio data to be transferred via the RD0 signal. The Receive Shift G Control signal enables reserved register 82 to provide a reserved data value to multiplexor 86. The plurality of Receive Mode Control signals then enables multiplexor 86 to provide the contents of reserved register 82 to shift register 72. Shift register 72 shifts the reserved data value to multiplexor 84. When enabled by one of the plurality of Receive Mode Control signals, multiplexor 84 provides the reserved data value to shift register 70. Shift register 70 provides the reserved data value to digital audio sink 28 via the RD0 signal when the Receive Shift A Control signal is asserted to enable shift register 70.

Concurrently, bits twenty-three through eight of the B channel of digital audio data are shifted from shift register 78 to digital audio sink 28 via the RD1 signal. Bits seven through zero are shifted out of shift register 80 to multiplexor 90. Again, the plurality of Receive Mode Control signals enables multiplexor 90 to provide the contents of shift register 80 to shift register 78. Shift register 78 transfers the former contents of shift register 80 to digital audio sink 28 via the RD1 signal. Bits seven through zero are concatenated with bits twenty-three through eight and are transferred in the first twenty-four bit time slot.

Non-audio data associated with Channel A digital data is concurrently shifted from shift register 74 to digital audio sink 28 via the RD2 signal. Shift register 74 shifts the Channel A non-audio data at a slow rate determined by the Receive Shift C Control signal. Concurrently, non-audio data associated with Channel B digital data is shifted from shift register 76 to shift register 74 in response to the Receive Shift D Control signal provided via Receive Shift Control bus 51. Shift register 74 shifts the B channel non-audio data to digital audio sink 28 via the RD2. Again, shift register 74 shifts the Channel B non-audio data at a slow rate determined by the Receive Shift C Control signals provided via Receive Shift Control bus 51.

In Mode 3, shift registers, 70, 72, and 82, are concatenated, in that order, to form a single large shift register for shifting A channel and reserved digital data. The plurality of Receive Mode Control signals enable each of multiplexors, 84 and 86, to configure the plurality of shift registers in this manner. Similarly, shift registers 78, 80, and 82 are concatenated, in that order, to form a single large shift register for shifting B channel and reserved digital data. The plurality of Receive Mode Control signals also enable multiplexors 90 and 92 to configure the plurality of shift registers in this manner. Additionally, a mode of operation indicated by the plurality of Receive Mode control signals does not typically change during operation of communications system 10.

Mode 3 is useful in twenty-four bit audio applications requiring a digital audio sink which is implemented as a digital to analog converter capable of processing information having a bit width of twenty-four bit bits.

Figure 11:
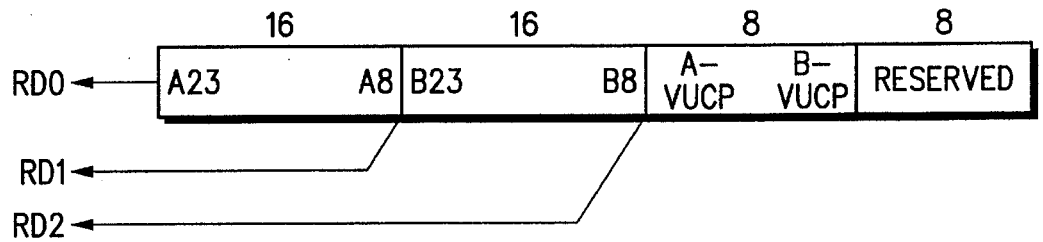
FIG. 11 illustrates in block diagram form a Mode 4 serial receive output mode.

In FIG. 11, a format referred to as "Mode 4" is illustrated. In Mode 4, digital audio and non-audio data having a data size of sixteen bits is transferred in three time slots, where each time slot transfers sixteen bits. When transceiver 20 is operating in serial receive Mode 4, a first sixteen bits, the A channel of digital audio data, is transferred via the RD0 signal. A second sixteen bits, the B channel of digital audio data, is transferred via both the RD0 and RD1 signals. Eight bits of digital non-audio information is transferred via each of the RD0, the RD1, and the RD2 signals. A last eight bits of reserved data is concatenated with the eight bits of digital non-audio information such that sixteen bits is transferred.

During operation, Mode 4 is executed by asserting the Receive Shift A control signal to enable shift register 70 to provide bits twenty-three through eight of an A channel of digital audio data to digital audio sink 28 via the RD0 signal. Bits twenty-three through eight of the B channel of digital audio data are shifted from shift register 78 to multiplexor 84. The plurality of Receive Mode Control signals enables multiplexor 84 to provide the contents of shift register 78 to shift register 70 where bits twenty-three through eight are shifted out in the next sixteen bit time slot following the transfer of bits twenty-three through eight of the A channel of digital audio information.

Non-audio data associated with Channel A digital data is shifted from shift register 74 to multiplexor 90 in response to the Receive Shift C Control signal. The plurality of Receive Mode Control signals enables multiplexor 90 to provide the digital non-audio data to shift register 78. Concurrently, non-audio data associated with Channel B digital data is shifted from shift register 76 to shift register 74 in response to the Receive Shift D signal. Shift register 74 then shifts the B channel non-audio data to multiplexor 90. Again, multiplexor 90 is enabled to provided to B channel digital non-audio data to shift register 78 such that the B channel non-audio data is concatenated to the A channel non-audio data. Shift register 78 is then enabled by the Receive Shift E signal to provide the concatenated A and B channel non-audio data to multiplexor 84. Again, one of the plurality of Receive Mode Control signals enables multiplexor 84 to provide the contents of shift register 78 to shift register 70. Shift register 70 then shifts output the digital non-audio data in the third sixteen bit time slot via the RD0 signal.

Eight bits of the contents of reserved register 82 are transferred in a remaining eight bits of the third time slot. The Receive Shift G signal enables reserved register 82 to provide a reserved data value to multiplexor 88. The plurality of Receive Mode Control signals then enables multiplexor 88 to provide the contents of reserved register 82 to shift register 76. Shift register 76 shifts the reserved data to shift register 74 when the Receive Shift D signal is asserted. Shift register 74 shifts the reserved data value to multiplexor 90 when the Receive Shift C signal is asserted. Multiplexor 90 provides the reserved data value to shift register 78. Shift register 78 provides the reserved data value to multiplexor 84 when the Receive Shift E signal is asserted. Multiplexor 84 then provides the reserved data value to shift register 70. Shift register 70 provides the reserved data value to digital audio sink 28 via the RD0 signal when the Receive Shift A signal is asserted to enable shift register 70.

In Mode 4, each of the plurality of shift registers, 70, 78, 76, 74, and 82, are concatenated, in that order, to form a single large shift register. The plurality of Receive Mode Control signals enable each of the plurality of multiplexors, 84, 88, and 90, to configure the plurality of shift registers in this manner. Additionally, a mode of operation indicated by the plurality of Receive Mode control signals does not typically change during operation of communications system 10.

Note, in Mode 4, the non-audio information is transferred at the same rate as the audio information and three sixteen bit time slots are required to provide all of the digital audio and non-audio information. Mode 4 is useful in sixteen bit commercial audio applications requiring a digital audio sink which is implemented as a DSP56001 with a SSI having sixteen bit time slots, or a DSP56156, both of which are digital signal processors currently available from Motorola, Inc. of Austin, Tex.

Figure 12:
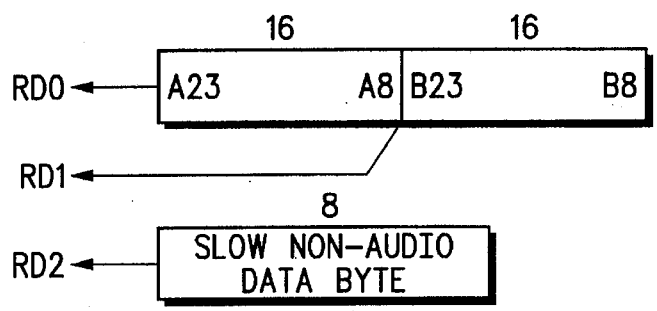
FIG. 12 illustrates in block diagram form a Mode 5 serial receive output mode.

A sixth format referred to as "Mode 5" is illustrated in FIG. 12. In Mode 5, digital audio data having a data size of sixteen and digital non-audio data having a data size of eight bits are concurrently transferred using two time slots, where each time slot transfers sixteen bits. When transceiver 20 is operating in serial receive Mode 5, a first sixteen bits of the A channel of digital audio data are transferred via the RD0 signal. Subsequently, a second sixteen bits of the B channel of digital audio data are also transferred via the RD0 signal. Eight bits of digital non-audio information are transferred in parallel to the A and B channels of audio information via the RD2 signal. The non-audio data is provided at a slower rate than the A and B channels of the audio information.

During operation, Mode 5 is executed by providing mode control signals to enable each of the plurality of shift registers, 70, 74, 76, 78, and 82. The Receive Shift A Control signal is provided to enable shift register 70 to provide bits twenty-three through eight of an A channel of digital audio data to digital audio sink 28 via the RD0 signal. Bits twenty-three through eight of the B channel of digital audio data are shifted from shift register 78 to multiplexor 84. The plurality of Receive Mode Control signals enables multiplexor 84 to provide the contents of shift register 78 to shift register 70 where bits twenty-three through eight are shifted out in the next sixteen bit time slot following the transfer of bits twenty-three through eight of the A channel of digital audio information.

Concurrently, non-audio data associated with Channel A digital data is shifted from shift register 74 to digital audio sink 28 via the RD2 signal. Shift register 74 shifts the Channel A non-audio data at a slow rate determined by the Receive Shift C Control signal. Concurrently, non-audio data associated with Channel B digital data is shifted from shift register 76 to shift register 74 in response to the Receive Shift D Control signal. Shift register 74 shifts the B channel non-audio data to digital audio sink 28 via the RD2 signal. Again, shift register 74 shifts the Channel B non-audio data at a slow rate determined by the Receive Shift C Control signal provided via Receive Shift Control bus 51.

In Mode 5, shift register 70 and 78 are concatenated, in that order, to form a single large shift register. The plurality of Receive Mode Control signals enable multiplexor 84 to configure the plurality of shift registers in this manner. Additionally, a mode of operation indicated by the plurality of Receive Mode control signals does not typically change during operation of communications system 10.

Mode 5 is useful in sixteen bit commercial audio applications requiring a digital audio sink that is implemented as a DSP56001 with a SSI having sixteen bit time slots, a digital signal processor currently available from Motorola, Inc. of Austin, Tex. Additionally, Mode 5 would be useful in applications using a sixteen bit DSP56156, another digital signal processor available from Motorola, Inc. of Austin, Tex. Additionally, Mode 5 might be implemented in applications in which the digital audio sink was implemented as a digital to analog converter. Additionally, when using Mode 5, digital audio sink might also be implemented as a sixteen bit $I^2S$ interface.

Figure 13:
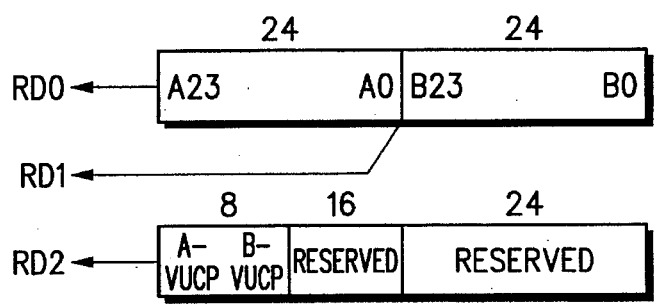
FIG. 13 illustrates in block diagram form a Mode 6 serial receive output mode.

Mode 6 is illustrated in FIG. 13. In Mode 6, digital audio data having a data size of twenty-four bits and digital non-audio data having a data size of eight bits is concurrently transferred using two time slots, where each time slot transfers twenty-four bits. When transceiver 20 is operating in serial receive Mode 6, a first twenty-four bits, the A channel of digital audio data, are transferred via the RD0 signal. Subsequently, a second twenty-four bits, the B channel of digital audio data, are also transferred via the RD0 signal. Eight bits of digital non-audio information are then transferred in parallel to the A and B channels of audio information via the RD2 signal. Additionally, sixteen and then twenty-four bits of reserved digital data are also transferred via the same signal as the digital non-audio data.

During operation in Mode 6, the Receive Shift A Control signal is provided to enable shift register 70 to provide bits twenty-three through eight of the A channel of digital audio data to digital audio sink 28 via the RD0 signal. Concurrently, bits seven through zero of the A channel of digital audio data are transferred to multiplexor 84. The plurality of Receive Mode Control signals enables multiplexor 84 to provide bits seven through zero of the A channel digital audio data to shift register 70. Bits seven through zero are concatenated to bits twenty-three through eight and are shifted to digital audio sink 28 via the RD0 signal during a first twenty-four bit time slot.

Bits twenty-three through eight of the B channel of digital audio data are shifted from shift register 78 to multiplexor 86. The plurality of Receive Mode Control signals enables multiplexor 86 to provide the contents of shift register 78 to shift register 72. Shift register 72 shifts the B channel digital audio data to multiplexor 84 when the Receive Shift B signal is asserted. Multiplexor 84 provides the B channel digital audio data to shift register 70. In shift register 70, bits twenty-three through eight are shifted out in the next twenty-four bit time slot following the transfer of bits twenty-three through zero of the A channel of digital audio information.

Bits seven through zero of the B channel digital audio data are shifted out of shift register 80 to multiplexor 90. Again, one of the plurality of Receive Mode Control signals enables multiplexor 90 to provide the contents of shift register 80 to shift register 78. Shift register 78 then transfers the former contents of shift register 80 to multiplexor 86. Multiplexor 86 subsequently provides bits seven through zero of the B channel digital audio data to shift register 72 upon receipt of one of the plurality of Receive Mode Control signals. Shift register 72 shifts bits seven through zero of the B channel digital audio data to multiplexor 84. Multiplexor then provides the B channel digital audio data to shift register 70. Shift register 70 shifts bits seven through zero of the B channel digital audio data to digital audio sink 28 via the RD0 signal in response to the Receive Shift A Control signal provided via Receive Shift Control bus 51. Bits seven through zero are concatenated with bits twenty-three through eight and are transferred in the second twenty-four bit time slot.

Concurrently, non-audio data associated with Channel A digital data is shifted from shift register 74 to digital audio sink 28 via the RD2 signal. Non-audio data associated with Channel B digital data is shifted from shift register 76 to shift register 74 in response to the Receive Shift D Control signal provided via Receive Shift Control bus 51. Shift register 74 then shifts the B channel non-audio data to digital audio sink 28 via the RD2.

One of the plurality of shift control signals enables reserved register 82 to provide a sixteen bit first reserved data value to multiplexor 88. The plurality of Receive Mode Control signals then enables multiplexor 88 to provide the contents of reserved register 82 to shift register 76. Shift register 76 shifts the reserved data value to shift register 74. When enabled by the Receive Shift C Control signal, shift register 74 provides the reserved data value to digital audio sink 28 via the RD2 signal.

Twenty-four bits of the contents of reserved register 82 are transferred in addition to the first reserved data value. One of the plurality of shift control signals enables reserved register 82 to provide a twenty-four bit second reserved data value to multiplexor 88. One of the plurality of Receive Mode Control signals then enables multiplexor 88 to provide the contents of reserved register 82 to shift register 76. Shift register 76 shifts the reserved data value to shift register 74. When enabled by one of the plurality of shift control signals, shift register 74 provides the reserved data value to digital audio sink 28 via the RD2 signal when an appropriate shift control signal is asserted to enable shift register 70.

In Mode 6, shift registers 70, 72, 78, and 80 are concatenated, in that order, to form a first single large shift register. The plurality of Receive Mode Control signals enable multiplexors 84, 86, and 90 to configure the plurality of shift registers in this manner. Similarly, shift registers 74, 76, and 82 are concatenated, in that order to form a second single large shift register. Multiplexor 88 is used to configure the plurality of shift registers in this manner. Additionally, a mode of operation indicated by the plurality of Receive Mode control signals does not typically change during operation of communications system 10.

In Mode 6, the non-audio information is transferred at the same rate as the audio information. Mode 6 is useful in twenty-four bit professional audio applications requiring a digital audio sink which is implemented as a twenty-four bit DSP56001.

Figure 14:
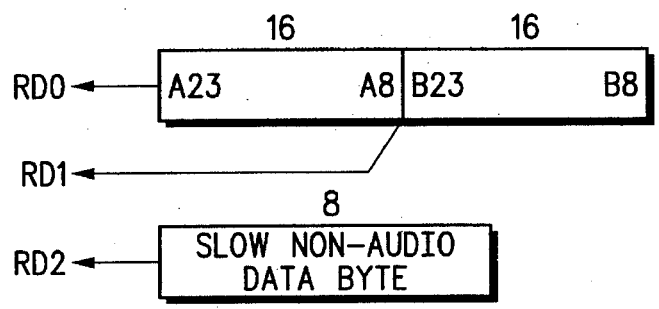
FIG. 14 illustrates in block diagram form a Mode 7 serial receive output mode.

Mode 7 is illustrated in FIG. 14. In Mode 7, digital audio data having a data size of sixteen bits and digital non-audio data having a data size of eight bits are concurrently transferred using two time slots, where each time slot transfers sixteen bits. When transceiver 20 is operating in serial receive Mode 7, a first sixteen bits, the A channel of digital audio data, are transferred via the RD0 signal. Subsequently, a second sixteen bits, the B channel of digital audio data, are also transferred via the RD0 signal. Eight bits of digital non-audio information are then transferred in parallel to the A and B channels of audio information via the RD2 signal. The non-audio data is provided at a slower rate than the A and B channels of the audio information.

During operation, the Receive Shift A Control signal is provided to enable shift register 70 to provide bits twenty-three through eight of the A channel of digital audio data to digital audio sink 28 via the RD0 signal. Bits twenty-three through eight of the B channel of digital audio data are shifted from shift register 78 to multiplexor 84. An appropriate one of the plurality of Receive Mode Control signals enables multiplexor 84 to provide the contents of shift register 78 to shift register 70 where bits twenty-three through eight are shifted out in the next sixteen time slot following the transfer of bits twenty-three through zero of the A channel of digital audio information.

Concurrently, non-audio data associated with Channel A digital data is shifted from shift register 74 to digital audio sink 28 via the RD2 signal. Shift register 74 shifts the Channel A non-audio data at a slow rate determined by the Receive Shift C Control signal. Non-audio data associated with Channel B digital data is concurrently shifted from shift register 76 to shift register 74 in response to the Receive Shift C Control signal. Shift register 74 shifts the B channel non-audio data to digital audio sink 28 via the RD2. Again, shift register 74 shifts the Channel B non-audio data at a slow rate determined by the Receive Shift C Control signal.

In Mode 7, shift registers 70 and 78 are concatenated, in that order, to form a first single large shift register. The plurality of Receive Mode Control signals enable multiplexor 84 to configure the plurality of shift registers in this manner. Additionally, a mode of operation indicated by the plurality of Receive Mode control signals does not typically change during operation of communications system 10.

Mode 7 is useful in applications which implement a digital audio sink as two time-synchronized digital to analog converters.

Each of Modes 0 through 7 may be used to enable the receiver portion of transceiver 20 to transfer data from modulated digital audio source 12 to unmodulated serial digital audio sink 28. Digital audio sink 28 may be implemented as a wide variety of digital sinks ranging from a complex digital signal processor to a digital to analog converter and no additional glue logic is required. Transceiver 20 is able to change a mode of operation for receiving digital audio and non-audio data by modifying a value of the plurality of Receive Mode Control signals such that many different types of applications may be supported with no additional glue logic.

During operation of the transmitter portion of transceiver 20, a user of communications system 10 programs the transmit mode control pins such that transceiver 20 may transmit digital audio and non-audio data in one of a plurality of possible serial transmit modes. The programmed transmit mode control pins are transferred as the Transmit Mode Control signal and are provided to state machine 58 and transmit output circuit 62. Additionally, digital audio source 22 provides the Transmit Synchronization Input signal to transceiver 20 via Transmitter Control bus 19. The Transmit Synchronization Input signal is asserted for one clock period to enable transceiver 20 to initiate a receive data transfer.

In response to the Transmit Synchronization Input signal and the plurality of Transmit Mode Control signals, state machine 58 provides a plurality of shift control signals via Transmit Shift Control bus 59. A respective one of the plurality of shift control signals is provided to at least one of the plurality of shift registers, 94, 96, 98, 100, 102, 104, 106 and 108, to control timing and speed of a shift operation. For example, in addition to determining when data should be shifted, the shift control signals also indicate how fast the data should be shifted out of the plurality of shift registers.

Additionally, Unmodulated Input bus 24 provides the digital data to a predetermined one of the plurality of multiplexors 114, 116, and 118. Digital data is stored directly in reserved register 106 and in reserved register 108, however. After passing through the plurality of multiplexors, the data is stored in one of the plurality of shift registers, 94, 96,

98, 100, 102, 104, 106, and 108. As was previously described, in our implementation of the invention, bit twenty-three through bit eight of an A channel of digital audio data are stored in shift register 94. Similarly, bit seven through bit zero of the A channel of digital audio data are stored in shift register 96. An A-channel digital non-audio data value is stored in shift register 98. Similarly, a B-channel digital non-audio data value is stored in shift register 100. Bit twenty-three through bit eight of a B channel of digital audio data are stored in shift register 102. Similarly, bit seven through bit zero of the B channel of digital audio data are stored in shift register 104. Reserved register 106 may be either forty, sixteen, or eight bits depending on an application and is reserved for information. Similarly, reserved register 108 may store either sixteen or eight bits of reserved data.

The plurality of Transmit Mode Control signals are provided to a respective one of the plurality of multiplexors 110, 112, 114, 116, and 118, to indicate which serial mode in which a digital data value should be received. Additionally, the digital data is transferred from the plurality of shift registers, 94, 96, 98, 100, 102, 104, 106, and 108, to digital audio modulator 46 via Transmit Digital Data bus 44.

During operation of the implementation of the invention described herein, eight possible formats may be used to serially transfer the digital audio and non-audio data. Each of the eight possible formats is illustrated in a respective one of FIG.'s 15 through 22.

Figure 15:
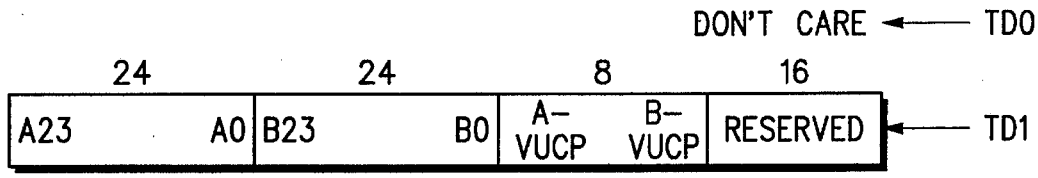
FIG. 15 illustrates in block diagram form a Mode 0 serial transmit output mode.

In FIG. 15, a first format referred to as "Mode 0" is illustrated. In Mode 0, digital audio and non-audio data having a data size of twenty-four bits is received in three time slots, where each time slot receives twenty-four bits. When transceiver 20 is operating in serial transmit Mode 0, a first twenty-four bits, the A channel of digital audio data, is received via the TD1 signal. Subsequently, a second twenty-four bits, the B channel of digital audio data. is also received via the TD1 signal. Additionally, eight bits of digital non-audio information is then received via the RD1 signal. A last sixteen bits is concatenated with the eight bits of digital non-audio information such that twenty-four bits is received.

During operation, Mode 0 is executed by providing the plurality of Transmit Mode Control signals to enable each of the plurality of multiplexors 110, 112, 114, 116, and 118. Additionally, the plurality of Shift Control signals enables each of the plurality of shift registers 94, 96, 98, 100, 102, 104, 106, and 108, to shift data in at an appropriate point in time. During execution of a transmit operation in Mode 0, bit twenty-three of the A channel digital data value is shifted in to reserved register 106 via the TD1 signal. Subsequently, each of the remaining bits of the A channel digital data value are shifted into reserved register 106 via the TD1 signal. The Transmit Shift G signal is asserted to enable reserved register 106 to shift out the A channel digital data value. The plurality of Transmit Mode Control signals, enable multiplexor 114 to provide the A channel digital data to shift register 100. Shift register 100 shifts the A channel digital data to shift register 98 when the Transmit Shift D signal is asserted. Shift register 98 asserts the Transmit Shift C control signal such that the A channel digital data is provided to multiplexor 118. The plurality of Transmit Mode Control signals enable multiplexor 118 to provide the A channel digital data to shift register 104. The Transmit Shift F control signal is asserted to enable shift register 104 to shift the A channel digital information to multiplexor 116. The plurality of Transmit Mode Control signals enable multiplexor 116 to transfer the A channel digital information to shift register 102. Shift register 102 shifts the A channel digital data to multiplexor 112 when the Transmit Shift E signal is asserted. Multiplexor 112 then provides the A channel digital data to shift register 96 when the plurality of Transmit Mode control signals enable multiplexor 112 to do so. The Transmit Shift B control signal enables shift register 96 to shift bits twenty-three of the A channel digital data to multiplexor 110. When enabled by the plurality of Transmit Mode Control signals, multiplexor 110 provides bits twenty-three through eight of the A channel digital data value to shift register 94. Bits twenty-three through eight are transferred to digital audio modulator 46 via Transmit Digital Data bus 44. Additionally, bits seven through zero of the A channel of digital data remain stored in shift register 96. Similarly, bits seven through zero of the A channel of digital data are transferred to Transmit Digital Data bus 44.

Twenty-four clock cycles after bit twenty-three of the A channel digital data is shifted to reserved register 106, bit twenty-three of the B channel digital data is transferred to reserved register 106. Each of the remaining bits of the B channel digital data value are also transferred to reserved register 106 via the TD1 signal. The Transmit Shift G signal is asserted to enable reserved register 106 to shift out bits twenty-three through zero of the B channel digital data value. The plurality of Transmit Mode Control signals, enable multiplexor 114 to provide the B channel digital data to shift register 100. Shift register 100 shifts the B channel digital data to shift register 98 when the Transmit Shift D signal is asserted. Shift register 98 asserts the Transmit Shift C control signal such that the B channel digital data is provided to multiplexor 118. The plurality of Transmit Mode Control signals enable multiplexor 118 to provide each bit of the B channel digital data to shift register 104. The Transmit Shift F control signal is asserted to enable shift register 104 to shift bits twenty-three through eight of the B channel digital information to multiplexor 116. Again, the plurality of Transmit Mode Control signals enable multiplexor 116 to transfer bits twenty-three through eight of the B channel digital information to shift register 102. Bits twenty-three through eight are transferred to Transmit Digital Data bus 44. Additionally, bits seven through zero of the B channel of digital data remain stored in shift register 104. Similarly, bits seven through zero of the B channel of digital data are transferred to digital audio modulator 46 via Transmit Digital Data bus 44.

Forty-eight clock cycles after bit twenty-three of the A channel digital data is transferred to reserved register 106, a V bit of the non-audio data associated with the A channel digital data is transferred to reserved register 106. Subsequently, each of the remaining bits of the A channel non-audio data is also transferred to reserved register 106 via the TD1 signal. The Transmit Shift G signal is asserted to enable reserved register 106 to shift out the A channel non-audio digital data. The plurality of Transmit Mode Control signals, enable multiplexor 114 to provide the A channel digital data to shift register 100. Shift register 100 shifts the A channel digital data to shift register 98 when the Transmit Shift D signal is asserted. Subsequently, the A channel non-audio digital data is transferred from shift register 98 to Transmit Digital Data bus 44.

Fifty-two clock cycles after bit twenty-three of the A channel digital data is transferred to reserved register 106, a V bit of the non-audio data associated with the B channel digital data is transferred to reserved register 106. Subsequently, each of the remaining bits of the B channel non-audio data is also transferred to reserved register 106 via the TD1 signal. The Transmit Shift G signal is then asserted to enable reserved register 106 to shift out the B channel non-audio digital data. The plurality of Transmit Mode Control signals, enable multiplexor 114 to provide the B channel digital data to shift register 100. Shift register 100 subsequently transfers the B channel digital data to Transmit Digital Data bus 44.

Fifty-six clock cycles after bit twenty-three of the A channel digital data is transferred to reserved register 106, a first bit of a reserved data value is transferred to reserved register 106. Subsequently, each of the remaining bits of the reserved digital data value is also transferred to reserved register 106 via the TD1 signal. Reserved register 106 transfers the reserved data value to digital audio modulator 46 via Transmit Digital Data bus 44.

In Mode 0, the non-audio information is transferred at the same rate as the audio information and three twenty-four bit time slots are required to provide all of the digital audio and non-audio information. Mode 0 is useful in twenty-four bit professional audio applications requiring a digital audio source which is implemented as a twenty-four bit DSP56001, a digital signal processor currently available from Motorola, Inc. of Austin, Tex.

Figure 16:
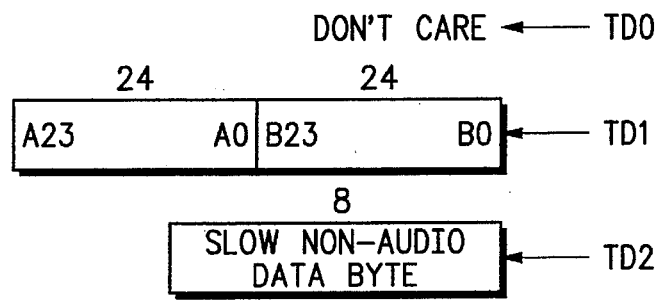
FIG. 16 illustrates in block diagram form a Mode I serial transmit output mode.

A second transmit format referred to as "Mode 1" is illustrated in FIG. 16. In Mode 1, digital audio data having a data size of twenty-four bits and digital non-audio data having a data size of eight bits is concurrently received using two time slots, where each time slot transfers twenty-four bits. When transceiver 20 is operating in serial transmit Mode 1, a first twenty-four bits of the A channel of digital audio data are received via the TD1 signal. A second twenty-four bits of the B channel of digital audio data are also received via the TD1 signal. Eight bits of digital non-audio information are concurrently transferred in parallel to the A and B channels of audio information via the TD2 signal. The non-audio data is received at a slower rate than the left and right channels of the audio information.

During operation, Mode 1 is executed by providing the plurality of Transmit Mode Control signals to enable each of the plurality of multiplexors 110, 112, 114, 116, and 118. Additionally, the plurality of Shift Control signals enables each of the plurality of shift registers 94, 96, 98, 100, 102, 104, 106, and 108, to shift data in at an appropriate point in time. During execution of a transmit operation in Mode 1, bit twenty-three of the A channel digital data value is provided to multiplexor 118 via the TD1 signal. Each of the remaining bits of the A channel digital data value are shifted into multiplexor 118 via the TD1 signal. The plurality of Transmit Mode Control signals enable multiplexor 118 to provide the A channel digital data to shift register 104. The Transmit Shift F control signal is asserted to enable shift register 104 to shift the A channel digital information to multiplexor 116. The plurality of Transmit Mode Control signals enable multiplexor 116 to transfer the A channel digital information to shift register 102. Shift register 102 shifts the A channel digital data to multiplexor 112 when the Transmit Shift E signal is asserted. Multiplexor 112 provides the A channel digital data to shift register 96 when the plurality of Transmit Mode control signals enable multiplexor 112 to do so. The Transmit Shift B control signal enables shift register 96 to shift bits twenty-three through eight of the A channel digital data to multiplexor 110. When enabled by the plurality of Transmit Mode Control signals, multiplexor 110 provides bits twenty-three through eight of the A channel digital data value to shift register 94. Bits twenty-three through eight are provided to Transmit Digital Data bus 44. Additionally, bits seven through zero of the A channel of digital data remain stored in shift register 96. Similarly, bits seven through zero of the A channel of digital data are provided to Transmit Digital Data bus 44.

Twenty-four clock cycles after bit twenty-three of the A channel digital data is shifted to reserved register 106, bit twenty-three of the B channel digital data is transferred to multiplexor 118. Subsequently, each of the remaining bits of the B channel digital data value are also transferred to multiplexor 118 via the TD1 signal. The plurality of Transmit Mode Control signals enable multiplexor 118 to provide the B channel digital data to shift register 104. The Transmit Shift F control signal is asserted to enable shift register 104 to shift bits twenty-three through eight of the B channel digital information to multiplexor 116. Again, the plurality of Transmit Mode Control signals enable multiplexor 116 to transfer bits twenty-three through eight of the B channel digital information to shift register 102. Bits twenty-three through eight are loaded to Transmit Digital Data bus 44. Additionally, bits seven through zero of the B channel of digital data remain stored in shift register 104. Similarly, bits seven through zero of the B channel of digital data are provided to Transmit Digital Data bus 44.

While the A channel digital data is transferred to multiplexor 118, a V bit of the non-audio data associated with the A channel digital data is transferred to multiplexor 114 via the TD2 signal. Subsequently, each of the remaining bits of the A channel non-audio data is also transferred to multiplexor 114 via the TD2 signal. The plurality of Transmit Mode Control signals enable multiplexor 114 to provide the A channel non-audio digital data to shift register 100. Shift register 100 shifts the A channel non-audio digital data to shift register 98 when the Transmit Shift D signal is asserted. Subsequently, the A channel non-audio digital data is provided from shift register 98 to Transmit Digital Data bus 44.

Four clock cycles after the V bit of the A channel non-audio digital data is transferred to multiplexor 114, a V bit of the non-audio data associated with the B channel digital data is transferred to multiplexor 114. Subsequently, each of the remaining bits of the B channel non-audio data is also transferred to multiplexor 114 via the TD2 signal. The plurality of Transmit Mode Control signals enable multiplexor 114 to provide the B channel digital data to shift register 100. Shift register 100 subsequently provides the B channel non-audio digital data to Transmit Digital Data bus 44.

Like Mode 0, Mode 1 is useful in twenty-four bit professional audio applications requiring a digital audio source which is implemented as a twenty-four bit DSP56001, a digital signal processor currently available from Motorola, Inc. of Austin, Tex. Additionally, Mode 1 would be useful in applications using a digital audio source with a twenty-four bit I$^2$S interface.

Figure 17:
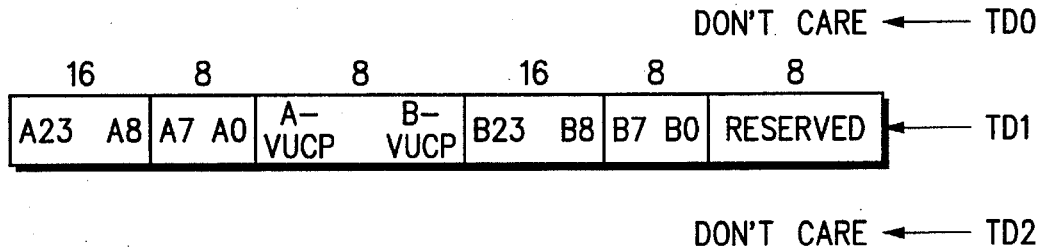
FIG. 17 illustrates in block diagram form a Mode 2 serial transmit output mode.

A third format referred to as "Mode 2" is illustrated in FIG. 17. In Mode 2, digital audio and non-audio data having a data size of twenty-four bits is received in four slots, where each time slot receives sixteen bits. When transceiver 20 is operating in serial transmit Mode 2, bits twenty-three through eight of the A channel of digital audio data are received in a first time slot. In a second time slot, bits seven through zero of the A channel of digital audio data are concatenated with the eight bits of digital non-audio data associated with both channel A and channel B. Bits twenty-three through eight of the B channel of digital data are received during a third time slot. During a fourth time slot, an eight bit reserved data value is concatenated with bits seven through zero of the B channel of digital data and both data values are subsequently received.

During execution of a transmit operation in Mode 2, bit twenty-three of the A channel digital data value is shifted in to reserved register 106 via the TD1 signal. Subsequently, each of the remaining bits of the A channel digital data value are shifted into reserved register 106 via the TD1 signal. The Transmit Shift G signal is asserted to enable reserved register 106 to shift out the A channel digital data value to multiplexor 118. The plurality of Transmit Mode Control signals enable multiplexor 118 to provide the A channel digital data from reserved register 106 to shift register 104. The Transmit Shift F control signal is asserted to enable shift register 104 to shift the A channel digital information to multiplexor 116. Again, the plurality of Transmit Mode Control signals enable multiplexor 116 to transfer the A channel digital information to shift register 102. Shift register 102 shifts the A channel digital data to multiplexor 114 when the Transmit Shift E signal is asserted. Multiplexor 114 then provides the A channel digital data to shift register 100. Shift register 100 shifts the A channel digital data to shift register 98 when the Transmit Shift D signal is asserted. When the Transmit Shift C control signal is asserted, the A channel digital data is provided to multiplexor 112. When the plurality of Transmit Mode control signals enable multiplexor 112, multiplexor 112 transfers the digital data to shift register 96. The Transmit Shift B control signal enables shift register 96 to shift bits twenty-three of the A channel digital data to multiplexor 110. When enabled by the plurality of Transmit Mode Control signals, multiplexor 110 provides bits twenty-three through eight of the A channel digital data value to shift register 94. Bits twenty-three through eight are transferred to Transmit Digital Data bus 44. Additionally, bits seven through zero of the A channel of digital data remain stored in shift register 96. Similarly, bits seven through zero of the A channel of digital data are transferred to Transmit Digital Data bus 44.

Twenty-four clock cycles after bit twenty-three of the A channel digital data is transferred to reserved register 106, a V bit of the non-audio data associated with the A channel digital data is transferred to reserved register 106. Subsequently, each of the remaining bits of the A channel non-audio data is also transferred to reserved register 106 via the TD1 signal. The Transmit Shift G signal is asserted to enable reserved register 106 to shift out the A channel non-audio digital data. The plurality of Transmit Mode Control signals, enable multiplexor 118 to provide the A channel digital non-audio data to shift register 104. Shift register 104 provides the A channel digital non-audio data to multiplexor 116 when the Transmit Shift F signal is asserted. Multiplexor 116 transfers the A channel non-audio information to shift register 102. When the Transmit Shift E signal is asserted, the A channel non-audio information is provided to multiplexor 114. Multiplexor 114 then provides the digital non-audio data to shift register 100. Shift register 100 shifts the A channel digital non-audio data to shift register 98 when the Transmit Shift D signal is asserted. Subsequently, the A channel non-audio digital data are provided by shift register 98 to digital audio modulator 46 via Transmit Digital Data bus 44.

Twenty-eight clock cycles after bit twenty-three of the A channel digital data is transferred to reserved register 106, a V bit of the non-audio data associated with the B channel digital data is transferred to reserved register 106. Subsequently, each of the remaining bits of the B channel non-audio data is also transferred to reserved register 106 via the TD1 signal. The Transmit Shift G signal is then asserted to enable reserved register 106 to shift out the B channel non-audio digital data to multiplexor 118. Multiplexor 118 provides the B channel non-audio data to shift register 104. When the Transmit Shift F signal is asserted, shift register 104 is enabled to provided the digital non-audio data to multiplexor 116. The plurality of Transmit Mode control signals enable multiplexor 116 to provide the B channel non-audio data to shift register 102. Shift register 102 provides the channel B non-audio data to multiplexor 114 when the Transmit Shift E signal is asserted. The plurality of Transmit Mode Control signals enable multiplexor 114 to provide the B channel digital data to shift register 100. Shift register 100 subsequently provides the B channel digital data to Transmit Digital Data bus 44.

Thirty-two clock cycles after bit twenty-three of the A channel digital data is shifted to reserved register 106, bit twenty-three of the B channel digital data is transferred to reserved register 106. Subsequently, each of the remaining bits of the B channel digital data value are also transferred to reserved register 106 via the TD1 signal. The Transmit Shift G signal is then asserted to enable reserved register 106 to shift out the B channel digital data value. The plurality of Transmit Mode Control signals enable multiplexor 118 to provide the B channel digital data to shift register 104. The Transmit Shift F control signal is asserted to enable shift register 104 to shift bits twenty-three through eight of the B channel digital information to multiplexor 116. Again, the plurality of Transmit Mode Control signals enable multiplexor 116 to transfer bits twenty-three through eight of the B channel digital information to shift register 102. Bits twenty-three through eight are provided to Transmit Digital Data bus 44. Additionally, bits seven through zero of the B channel of digital data remain stored in shift register 104. Similarly, bits seven through zero of the B channel of digital data are provided to digital audio modulator 46 via Transmit Digital Data bus 44.

Fifty-six clock cycles after bit twenty-three of the A channel digital data is transferred to reserved register 106, a first bit of a reserved data value is transferred to reserved register 106. Subsequently, each of the remaining bits of the reserved digital data value is also transferred to reserved register 106 via the TD1 signal. Reserved register 106 then provides the reserved data value to Transmit Digital Data bus 44.

In Mode 2, the non-audio information is received at the same rate as the audio information and four sixteen bit time slots are required to provide all of the digital audio and non-audio information. Mode 2 is useful in sixteen bit professional audio applications requiring a digital audio source which is implemented as a sixteen bit DSP56156, a digital signal processor currently available from Motorola, Inc. of Austin, Tex.

Figure 18:
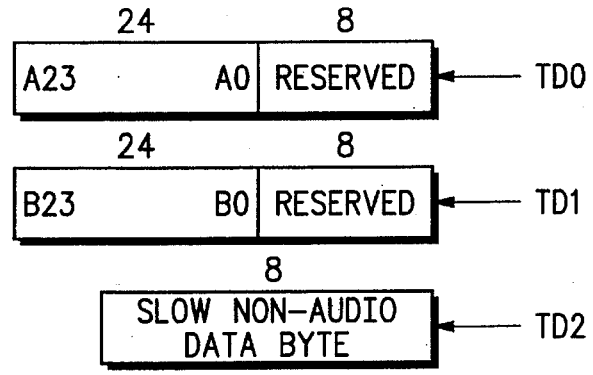
FIG. 18 illustrates in block diagram form a Mode 3 serial transmit output mode.

A fourth transmit format referred to as "Mode 3" is illustrated in FIG. 18. In Mode 3, digital audio data having a data size of twenty-four bits and digital non-audio data having a data size of eight bits is concurrently received using two time slots. When transceiver 20 is operating in serial transmit Mode 3, a first twenty-four bits of digital audio data, the A channel, is received via the TD0 signal. Eight bits of a reserved data value are concatenated to the channel A digital audio value and are also received via the TD0 signal. A second twenty-four bits of digital data, the B channel, is concurrently received via the TD1 signal. Again, eight bits of a reserved data value are concatenated with the channel B digital audio value and are also received via the TD1 signal. Eight bits of digital non-audio information are received in parallel to the A and B channels of audio information via the TD2 signal. The non-audio data is provided at a slower rate than the A and B channels of the audio information.

During execution of a transmit operation in Mode 3, bit twenty-three of the A channel digital data value is shifted in to reserved register 108 via the TD0 signal. Subsequently, each of the remaining bits of the A channel digital data value are shifted into reserved register 108 via the TD0 signal. The Transmit Shift H signal is asserted to enable reserved register 108 to shift out the A channel digital data value. The plurality of Transmit Mode Control signals, enable multiplexor 112 to provide the A channel digital data to shift register 96. The Transmit Shift B control signal enables shift register 96 to shift bits twenty-three of the A channel digital data to multiplexor 110. When enabled by the plurality of Transmit Mode Control signals, multiplexor 110 provides bits twenty-three through eight of the A channel digital data value to shift register 94. Bits twenty-three through eight are provided to Transmit Digital Data bus 44. Additionally, bits seven through zero of the A channel of digital data remain stored in shift register 96. Similarly, bits seven through zero of the A channel of digital data are provided to Transmit Digital Data bus 44.

Twenty-four clock cycles after bit twenty-three of the A channel digital data is transferred to reserved register 108, a first bit of a first reserved data value is transferred to reserved register 108. Subsequently, each of the remaining bits of the first reserved digital data value is also transferred to reserved register 108 via the TD0 signal. Reserved register 108 then provides the first reserved data value to Transmit Digital Data bus 44.

When bit twenty-three of the A channel digital data is shifted to reserved register 108, bit twenty-three of the B channel digital data is concurrently transferred to reserved register 106. Subsequently, each of the remaining bits of the B channel digital data value are also transferred to reserved register 106 via the TD1 signal. The Transmit Shift G signal is asserted to enable reserved register 106 to shift out the B channel digital data value. The plurality of Transmit Mode Control signals, enable multiplexor 118 to provide the B channel digital data to shift register 104. Shift register 104 shifts the B channel digital data to multiplexor 116 when the Transmit Shift F signal is asserted. Multiplexor 116 provides the B channel digital data to shift register 102. Bits twenty-three through eight of the B channel digital data are transferred to digital audio modulator 46 via Transmit Digital Data bus 44. Additionally, bits seven through zero of the B channel of digital data remain stored in shift register 104. Similarly, bits seven through zero of the B channel of digital data are provided to Transmit Digital Data bus 44.

Twenty-four clock cycles after bit twenty-three of the B channel digital data is transferred to reserved register 106, a first bit of a second reserved data value is transferred to reserved register 106. Subsequently, each of the remaining bits of the second reserved digital data value is also transferred to reserved register 106 via the TD1 signal. Reserved register 106 then provides the second reserved data value to Transmit Digital Data bus 44.

While the A channel digital data is transferred to reserved register 108 and the B channel digital data is transferred to reserved register 106, a V bit of the non-audio data associated with the A channel digital data is transferred to multiplexor 114 via the TD2 signal. Subsequently, each of the remaining bits of the A channel non-audio data is also transferred to multiplexor 114 via the TD2 signal. The Transmit Shift G signal is asserted to enable multiplexor 114 to shift out the A channel non-audio digital data. The plurality of Transmit Mode Control signals enable multiplexor 114 to provide the A channel non-audio digital data to shift register 100. Shift register 100 shifts the A channel non-audio digital data to shift register 98 when the Transmit Shift D signal is asserted. Subsequently, the A channel non-audio digital data is provided by shift register 98 to Transmit Digital Data bus 44.

Four clock cycles after the V bit of the A channel non-audio digital data is transferred to multiplexor 114, a V bit of the non-audio data associated with the B channel digital data is transferred to multiplexor 114. Subsequently, each of the remaining bits of the B channel non-audio data is also transferred to multiplexor 114 via the TD2 signal. The Transmit Shift G signal is then asserted to enable multiplexor 114 to shift out the B channel non-audio digital data. The plurality of Transmit Mode Control signals, enable multiplexor 114 to provide the B channel digital data to shift register 100. Shift register 100 provides the B channel non-audio digital data to digital audio modulator 46 via Transmit Digital Data bus 44.

Mode 3 is useful in twenty-four bit audio applications requiring a digital audio source which is implemented as an analog to digital converter capable of processing information having a bit width of twenty-four bit bits.

Figure 19:
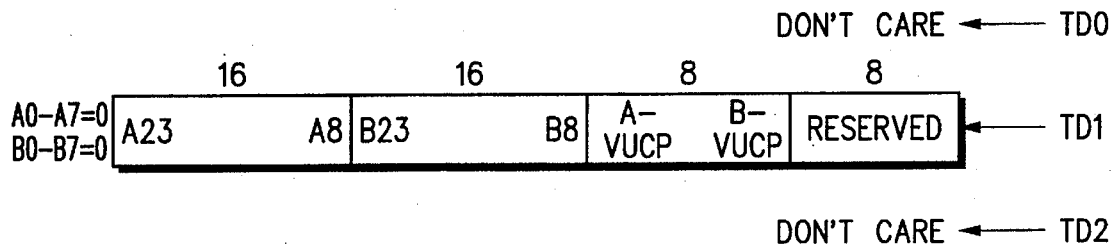
FIG. 19 illustrates in block diagram form a Mode 4 serial transmit output mode.

In FIG. 19, a transmit for_mat referred to as "Mode 4" is illustrated. In Mode 4, digital audio and non-audio data having a data size of sixteen bits is received in three time slots, where each time slot receives sixteen bits. When transceiver 20 is operating in serial transmit Mode 4, a first sixteen bits, the A channel of digital audio data, is received via the TD1 signal. Subsequently, a second sixteen bits, the B channel of digital audio data, is also received via the TD1 signal. Eight bits of digital non-audio information is also received. A last eight bits of reserved data is concatenated with the eight bits of digital non-audio information such that sixteen bits is received.

During operation, bit twenty-three of the A channel digital data value is shifted in to reserved register 106 via the TD1 signal. Subsequently, fifteen remaining bits of the A channel digital data value are shifted into reserved register 106 via the TD1 signal. The Transmit Shift G signal is asserted to enable reserved register 106 to shift out the A channel digital data value to multiplexor 114. The plurality of Transmit Mode Control signals enable multiplexor 114 to provide the A channel digital data to shift register 100. Shift register 100 shifts the A channel digital data to shift register 98 when the Transmit Shift D signal is asserted. The Transmit Shift C control signal enables shift register 98 to provide the A channel digital data to multiplexor 116. The plurality of Transmit Mode Control signals enable multiplexor 116 to provide the A channel digital data to shift register 102. The Transmit Shift E control signal is asserted to enable shift register 102 to shift the A channel digital information to multiplexor 110. Again, the plurality of Transmit Mode Control signals enable multiplexor 110 to transfer the A channel digital information to shift register 94. Bits twenty-three through eight are provided by shift register 94 to Transmit Digital Data bus 44. Bits seven through zero of the A channel of digital data are not received in this mode of operation.

Sixteen clock cycles after bit twenty-three of the A channel digital data is shifted to reserved register 106, bit twenty-three of the B channel digital data is transferred to reserved register 106. Subsequently, fifteen remaining bits of the B channel digital data value are also transferred to reserved register 106 via the TD1 signal. The Transmit Shift G signal is asserted to enable reserved register 106 to shift out the B channel digital data value to multiplexor 114. The plurality of Transmit Mode Control signals enable multiplexor 114 to provide the B channel digital data to shift register 100. Shift register 100 shifts the B channel digital data to shift register 98 when the Transmit Shift D signal is asserted. Shift register 98 asserts the Transmit Shift C control signal such that the B channel digital data is provided to multiplexor 116. The plurality of Transmit Mode Control signals enable multiplexor 116 to provide the B channel digital data to shift register 102. Bits twenty-three through eight of the B channel digital data are provided to Transmit Digital Data bus 44. As with the A channel digital data, bits seven through zero of the B channel digital data are not received in serial transmit Mode 4.

Thirty-two clock cycles after bit twenty-three of the A channel digital data is transferred to reserved register 106, a V bit of the non-audio data associated with the A channel digital data is transferred to reserved register 106. Subsequently, each of the remaining bits of the A channel non-audio data is also transferred to reserved register 106 via the TD1 signal. The Transmit Shift G signal is asserted to enable reserved register 106 to shift out the A channel non-audio digital data. The plurality of Transmit Mode Control signals enable multiplexor 114 to provide the A channel digital data to shift register 100. Shift register 100 shifts the A channel digital data to shift register 98 when the Transmit Shift D signal is asserted. Subsequently, the A channel non-audio digital data is provided from shift register 98 to Transmit Digital Data bus 44.

Thirty-six cycles after bit twenty-three of the A channel digital data is transferred to reserved register 106, a V bit of the non-audio data associated with the B channel digital data is transferred to reserved register 106. Subsequently, each of the remaining bits of the B channel non-audio data is also transferred to reserved register 106 via the TD1 signal. The Transmit Shift G signal is asserted to enable reserved register 106 to shift out the B channel non-audio digital data. The plurality of Transmit Mode Control signals, enable multiplexor 114 to provide the B channel digital data to shift register 100. Shift register 100 subsequently provides the B channel digital data to digital audio modulator 46 via Transmit Digital Data bus 44.

Forty clock cycles after bit twenty-three of the A channel digital data is transferred to reserved register 106, a first bit of a reserved data value is transferred to reserved register 106. Subsequently, each of the remaining bits of the reserved digital data value is also transferred to reserved register 106 via the TD1 signal. Reserved register 106 then provides the reserved data value to Transmit Digital Data bus 44.

Note, in transmit Mode 4, the non-audio information is received at the same rate as the audio information and three sixteen bit time slots are required to provide all of the digital audio and non-audio information. Mode 4 is useful in sixteen bit commercial audio applications requiring a digital audio source which is implemented as a twenty-four bit DSP56001 with sixteen bit SSI (Serial Synchronous Interface) time slots or a sixteen bit DSP56156, both of which are digital signal processors currently available from Motorola, Inc. of Austin, Tex.

Figure 20:
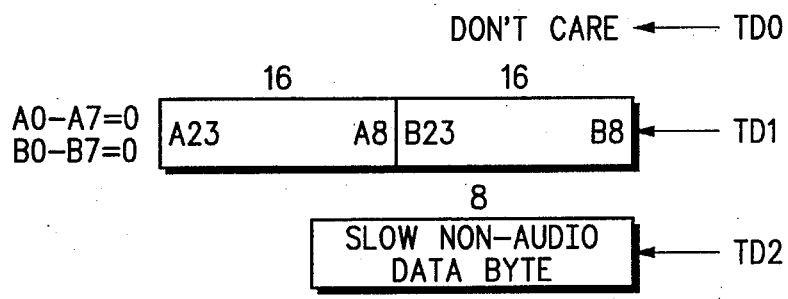
FIG. 20 illustrates in block diagram form a Mode 5 serial transmit output mode.

A sixth serial transmit format referred to as "Mode 5" is illustrated in FIG. 20. In Mode 5, digital audio data having a data size of sixteen and digital non-audio data having a data size of eight bits are concurrently received using two time slots. When transceiver 20 is operating in serial Transmit Mode 5, a first sixteen bits of digital audio data, the A channel, is received via the TD1 signal. Subsequently, a second sixteen bits of digital audio data, the B channel, is also received via the TD1 signal. Eight bits of digital non-audio information are received in parallel to the A and B channels of audio information via the TD2 signal. The non-audio data is provided at a slower rate than the A and B channels of the audio information.

During execution of a transmit operation in Mode 5, bit twenty-three of the A channel digital data value is transferred to multiplexor 116 via the TD1 signal. Subsequently, fifteen remaining bits of the A channel digital data value are provided to multiplexor 116 via the TD1 signal. The plurality of Transmit Mode Control signals enable multiplexor 116 to provide the A channel digital data to shift register 102. The Transmit Shift E control signal is asserted to enable shift register 102 to shift the A channel digital information to multiplexor 110. Again, the plurality of Transmit Mode Control signals enable multiplexor 110 to transfer the A channel digital information to shift register 94. Shift register 94 provides the A channel digital data to Transmit Digital Data bus 44. Bits seven through zero of the A channel of digital data are not received via the TD1 signal.

Sixteen clock cycles after bit twenty-three of the A channel digital data is shifted to shift register 102, bit twenty-three of the B channel digital data is transferred to multiplexor 116. Subsequently, fifteen remaining bits of the B channel digital data value are also transferred to multiplexor 116 via the TD1 signal. The plurality of Transmit Mode Control signals enable multiplexor 116 to provide the B channel digital data to shift register 102. Bits twenty-three through eight are provided to Transmit Digital Data bus 44. As with the A channel digital data, bits seven through zero of the B channel of digital data are not received via the TD1 signal.

While the A channel digital data is transferred to reserved register 106, a V bit of the non-audio data associated with the A channel digital data is transferred to multiplexor 114 via the TD2 signal. Subsequently, each of the remaining bits of the A channel non-audio data is also transferred to multiplexor 114 via the TD2 signal. The Transmit Shift G signal is asserted to enable multiplexor 114 to shift out the A channel non-audio digital data. The plurality of Transmit Mode Control signals enable multiplexor 114 to provide the A channel non-audio digital data to shift register 100. Shift register 100 shifts the A channel non-audio digital data to shift register 98 when the Transmit Shift D signal is asserted. Subsequently, the A channel non-audio digital data is provided by shift register 98 to Transmit Digital Data bus 44.

Four clock cycles after the V bit of the A channel non-audio digital data is transferred to multiplexor 114, a V bit of the non-audio data associated with the B channel digital data is transferred to multiplexor 114. Subsequently, each of the remaining bits of the B channel non-audio data is also transferred to multiplexor 114 via the TD2 signal. The plurality of Transmit Mode Control signals is asserted to enable multiplexor 114 to shift the B channel non-audio digital data to shift register 100. Shift register 100 subsequently transfers the B channel non-audio digital data to Transmit Digital Data bus 44.

Mode 5 is useful in sixteen bit commercial audio applications requiring a digital audio source that is implemented as a twenty-four bit DSP56001, a digital signal processor with sixteen bit SSI time slots, currently available from Motorola, Inc. of Austin, Tex. Additionally, Mode 5 would be useful in applications using a sixteen bit DSP56156, another digital signal processor available from Motorola, Inc. of Austin, Tex. Additionally, Mode 5 might be implemented in applications in which the digital audio source is implemented as an analog to digital converter. Additionally, when using Mode 5, the digital audio source might also be implemented as a sixteen bit I²S interface.

Figure 21:
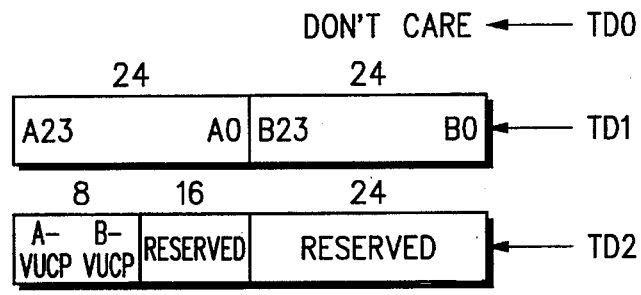
FIG. 21 illustrates in block diagram form a Mode 6 serial transmit output mode.

Serial transmit Mode 6 is illustrated in FIG. 21. In Mode 6, digital audio data having a data size of twenty-four bits and digital non-audio data having a data size of eight bits is concurrently received using two time slots. When transceiver 20 is operating in serial transfer Mode 6, a first twenty-four bits of the A channel of digital audio data are transferred via the TD1 signal. Subsequently, a second twenty-four bits of the B channel of digital audio data are also transferred via the TD1 signal. Eight bits of digital non-audio information are transferred in parallel to the A and B channels of audio information via the TD2 signal. Additionally, sixteen and then twenty-four bits of reserved digital data are also transferred via the same signal as the digital non-audio data.

During operation in serial transmit Mode 6, bit twenty-three of the A channel digital data value is provided to multiplexor 118 via the TD1 signal. Subsequently, each of the remaining bits of the A channel digital data value are shifted into multiplexor 118 via the TD1 signal. The plurality of Transmit Mode Control signals enable multiplexor 118 to provide the A channel digital data to shift register 104. The Transmit Shift F control signal is asserted to enable shift register 104 to shift the A channel digital information to multiplexor 116. The plurality of Transmit Mode Control signals enable multiplexor 116 to transfer the A channel digital information to shift register 102. Shift register 102 shifts the A channel digital data to multiplexor 112 when the Transmit Shift E signal is asserted. Multiplexor 112 provides the A channel digital data to shift register 96 when the plurality of Transmit Mode control signals enable multiplexor 112 to do so. The Transmit Shift B control signal enables shift register 96 to shift bits twenty-three through eight of the A channel digital data to multiplexor 110. When enabled by the plurality of Transmit Mode Control signals, multiplexor 110 provides bits twenty-three through eight of the A channel digital data value to shift register 94. Bits twenty-three through eight are provided to Transmit Digital Data bus 44. Additionally, bits seven through zero of the A channel of digital data remain stored in shift register 96. Similarly, bits seven through zero of the A channel of digital data are provided to Transmit Digital Data bus 44.

Twenty-four dock cycles after bit twenty-three of the A channel digital data is transferred to multiplexor 118, bit twenty-three of the B channel digital data is transferred to multiplexor 118. Subsequently, each of the remaining bits of the B channel digital data value are also transferred to multiplexor 118 via the TD1 signal. The plurality of Transmit Mode Control signals enable multiplexor 118 to provide bits twenty-three through zero of the B channel digital data to shift register 104 one bit at a time. The Transmit Shift F control signal is asserted to enable shift register 104 to shift bits twenty-three through eight of the B channel digital information to multiplexor 116. The plurality of Transmit Mode Control signals enable multiplexor 116 to transfer bits twenty-three through eight of the B channel digital data to shift register 102. Bits twenty-three through eight of the B channel digital data are provided by shift register 102 to Transmit Digital Data bus 44. Additionally, bits seven through zero of the B channel of digital data remain stored in shift register 104. Similarly, bits seven through zero of the B channel of digital data are provided to Transmit Digital Data bus 44.

While the A channel digital data is transferred to multiplexor 118, the non-audio data associated with the A channel digital data is transferred to reserved register 109 via the TD2 signal. Reserved register 109 provides the non-audio A channel digital data to multiplexor 114. Multiplexor 114 provides the channel A non-audio data to shift register 100. Shift register 100 provides the A channel non-audio data to shift register 98 when the Transmit Shift C signal is asserted. The A channel digital non-audio data is stored in shift register 98.

Four clock cycles after the A channel non-audio data is provided to reserved register 109, the non-audio data associated with the B channel digital data is also transferred to reserved register 109. Reserved register 109 provides the non-audio B channel digital data to multiplexor 114. Multiplexor 114 provides the B channel digital data to shift register 100. The B channel non-audio data remains stored in shift register 100.

Eight clock cycles after the A channel non-audio data is provided to reserved register 109, a sixteen bit first reserved data value is provided to reserved register 109 via the TD2 signal. The first reserved data value is stored in reserved register 109.

Twenty-four clock cycles after the A channel non-audio data is provided to reserved register 109, a twenty-four bit second reserved data value is provided to reserved register 109 via the TD2 signal. The second reserved data value is concatenated to and stored with the first reserved data value in reserved register 109.

In Mode 6, the non-audio information is received at the same rate as the audio information. Mode 6 is useful in twenty-four bit professional audio applications requiring a digital audio source which is implemented as a twenty-four bit DSP56001.

Figure 22:
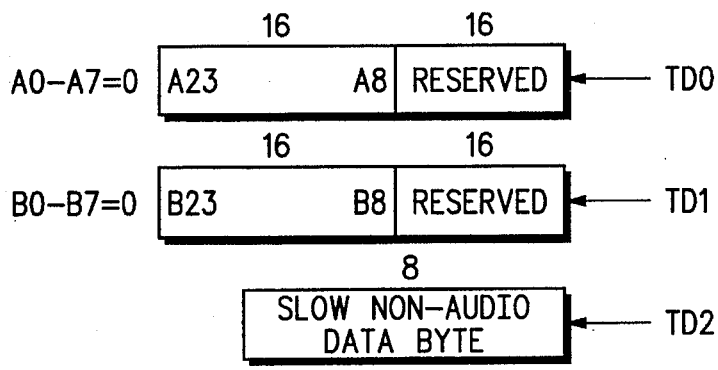
FIG. 22 illustrates in block diagram form a Mode 7 serial transmit output mode.

Mode 7 is illustrated in FIG. 22. In Mode 7, digital audio data having a data size of sixteen and digital non-audio data having a data size of eight bits are concurrently received using two time slots. When transceiver 20 is operating in serial receive Mode 7, a first sixteen bits of digital data, the A channel, is received via the TD0 signal. Additionally, a first sixteen bit reserved data value is concatenated with the A channel digital audio data and is received via the TD0 signal. A second sixteen bits of the digital data, the B channel, is received via the TD1 signal. A second sixteen bit reserved data value is concatenated with the B channel digital audio data and is received via the TD1 signal. Eight bits of digital non-audio information are received in parallel to the A and B channels of audio information via the TD2 signal. The non-audio data is provided at a slower rate than the A and B channels of the audio information.

During execution of a transmit operation in transmit Mode 7, bit twenty-three of the A channel digital data value is shifted in to reserved register 108 via the TD0 signal. Subsequently, fifteen remaining bits of the A channel digital data value are shifted into reserved register 108 via the TD0 signal. The Transmit Shift H signal is asserted to enable reserved register 108 to shift out the A channel digital data value to multiplexor 110. The plurality of Transmit Mode Control signals, enable multiplexor 110 to provide the A channel digital data to shift register 94. Bits twenty-three through eight are subsequently provided to Transmit Digital Data bus 44. Bits seven through zero of the A channel of digital data are not received by serial mode transmit output 62.

Sixteen clock cycles after bit twenty-three of the A channel digital data is transferred to reserved register 108, a first bit of a first reserved data value is transferred to reserved register 108. Subsequently, each of the remaining bits of the first reserved digital data value is also transferred to reserved register 108 via the TD0 signal. Reserved register 108 then provides the first reserved data value to Transmit Digital Data bus 44.

When bit twenty-three of the A channel digital data is shifted to reserved register 108, bit twenty-three of the B channel digital data is transferred to reserved register 106. Subsequently, fifteen remaining bits of the B channel digital data value are also transferred to reserved register 106 via the TD1 signal. The Transmit Shift G signal is asserted to enable reserved register 106 to shift out the B channel digital data value to multiplexor 116. The plurality of Transmit Mode Control signals, enable multiplexor 116 to provide the B channel digital data to shift register 102. Bits twenty-three through eight of the B channel digital data are provided to Transmit Digital Data bus 44. Bits seven through zero of the B channel of digital data are not received.

Sixteen clock cycles after bit twenty-three of the B channel digital data is transferred to reserved register 106, a first bit of a second reserved data value is transferred to reserved register 106. Subsequently, each of the remaining bits of the second reserved digital data value is also transferred to reserved register 106 via the TD1 signal. Reserved register 106 then provides the second reserved data value to Transmit Digital Data bus 44.

While the A channel digital data is transferred to reserved register 108 and the B channel digital data is transferred to reserved register 106, a V bit of the non-audio data associated with the A channel digital data is transferred to multiplexor 114 via the TD2 signal. Subsequently, each of the remaining bits of the A channel non-audio data is also transferred to multiplexor 114 via the TD2 signal. The plurality of Transmit Mode Control signals enables multiplexor 114 to shift out the A channel non-audio digital data. The plurality of Transmit Mode Control signals enable multiplexor 114 to provide the A channel non-audio digital data to shift register 100. Shift register 100 loads the A channel non-audio digital data to shift register 98 when the Transmit Shift D signal is asserted. Subsequently, the A channel non-audio digital data is provided from shift register 98 to Transmit Digital Data bus 44.

Four clock cycles after the V bit of the A channel non-audio digital data is transferred to multiplexor 114, a V bit of the non-audio data associated with the B channel digital data is transferred to multiplexor 114. Subsequently, each of the remaining bits of the B channel non-audio data is also transferred to multiplexor 114 via the TD2 signal. The Transmit Shift G signal is then asserted to enable multiplexor 114 to shift out the B channel non-audio digital data. The plurality of Transmit Mode Control signals enable multiplexor 114 to provide the B channel digital data to shift register 100. Shift register 100 provides the B channel non-audio digital data to Transmit Digital Data bus 44.

Mode 7 is useful in applications which implement a digital audio source as two time-synchronized analog to digital converters, such as a DSP56ADC16. The DSP56ADC16 is currently available from Motorola, Inc. of Austin, Tex.

Each of serial transmit Modes 0 through 7 may be used to enable the transmitter portion of transceiver 20 to transfer data from unmodulated serial digital audio source 22 to modulated serial digital audio sink 16. Transceiver 20 is able to change a mode of operation for transmitting digital audio and non-audio data by modifying a value of the plurality of Receive Mode Control signals such that many different types of applications may be supported with no additional glue logic.

In summary, a user provides a plurality of receive and transmit mode control signals to transceiver 20 to respectively receive and transmit digital data in a predetermined serial mode. In the example described herein, eight different receive modes and eight different transmit modes are selected by allowing a user to access programming pins of transceiver 20. The user may program transceiver 20 by providing the proper mode control signals from either modulated digital audio sink 28 via a Receiver Control bus 13 or unmodulated serial digital audio source 22 via a Transmitter Control bus 19.

The programming pins allow a user to either receive or transmit data in a plurality of modes such that the transceiver described herein may be used in a wide variety of applications without the addition of external interface circuitry. For example, transceiver 20 may be used as an interface with digital audio sources and sinks implemented as a digital signal processor, such as a DSP56001. The DSP56001 is commercially available from Motorola, Inc. of Austin, Tex. Furthermore, transceiver 20 may be used to interface with digital signal processors having both a twenty-four bit and a sixteen bit digital data transmission protocol. Other digital signal processors such as a sixteen bit DSP56156 and a thirty-two bit DSP32C are also supported by one of the modes of receipt or transmission of transceiver 20. Additionally, analog to digital converters and digital to analog converters may also be used to respectively provide or receive digital audio data. In prior art solutions, a separate interface might be required for each of these digital audio sources and sinks. Therefore, the flexibility of the user is limited by the inability of the interface to accommodate more than one receipt or transmission format.

The implementations of the invention described herein are provided by way of example only, however, and many other implementations may exist for executing the function described herein. For example, other mode which may be used by the user may be implemented. The receive and transmit modes implemented in this embodiment of the invention were chosen to reflect a best variety of digital audio sources and sinks currently available. However, a designer of transceiver 20 may provide different modes of operation.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A transceiver for communicating a plurality of digital audio data values between a modulated digital audio source and an unmodulated digital audio sink, the transceiver comprising:

a digital audio demodulator for receiving the plurality of digital audio data values from the modulated digital audio source, the digital audio demodulator demodulating the plurality of digital audio data values to provide a plurality of demodulated audio data values in a first format;

a state machine for receiving a plurality of mode control signals, the state machine providing a plurality of receive control signals in response to the plurality of mode control signals; and a receive output circuit having a first input for receiving the plurality of mode control signals, having a second input for receiving the plurality of receive control signals, and having a third input for receiving the plurality of demodulated digital data values in the first format, the receive output circuit rearranging the plurality of demodulated digital data values in the first format to provide the plurality of demodulated audio data values in the second format, the receive output circuit comprising:

a plurality of shift registers connected in a predetermined configuration, each of the plurality of shift registers storing a portion of one of the plurality of demodulated digital data values; and a plurality of multiplexors for receiving the plurality of mode control signals, the plurality of multiplexors using the plurality of mode control signals to connect the plurality of shift registers in the predetermined configuration.

2. The transceiver of claim 1 wherein the first format is comprised of a first audio channel having a first bit width, a first non-audio channel having a second bit width, a second audio channel having a third bit width, and a second non-audio channel having a fourth bit width, the first format transferring the plurality of digital data in the order of the first audio channel, the first non-audio channel, the second audio channel, and the second non-audio channel.

3. The transceiver of claim 1 wherein the second format transfers one of the plurality of demodulated audio data values in the order of a first audio channel having a first bit width, a second audio channel having a second bit width, a first non-audio channel having a third bit width, a second non-audio channel having a fourth bit width.

4. The transceiver of claim 3 wherein the second format transfers a reserved data value after transferring the second non-audio channel.

5. The transceiver of claim 1 wherein the second format transfers one of the plurality of demodulated audio data values in the order of a first audio channel having a first bit width and a second audio channel having a second bit width, a first non-audio channel having a third bit width and a second non-audio channel having a fourth bit width being transferred concurrently with the first and second audio channels.

6. The transceiver of claim 1 wherein the second format transfers one of the plurality of demodulated audio data values in the order of a first audio channel having a first bit width, a first non-audio channel having a third bit width, a second non-audio channel having a fourth bit width, a second audio channel having a second bit width, and a reserved data value.

7. The transceiver of claim 1 wherein the second format transfers one of the plurality of demodulated audio data values in the order of a first audio channel having a first bit width and a first reserved data value, concurrently transferring a second audio channel having a second bit width and a second reserved data value, and a first non-audio channel value having a third bit width and a second non-audio channel value having a fourth bit width are transferred concurrently with the first and second audio channels.

8. The transceiver of claim 1 wherein the predetermined configuration of the plurality of shift registers is modified in accordance with the plurality of mode control signals.

9. A transceiver for communicating a plurality of digital audio data values between an unmodulated digital audio source and a modulated digital audio sink, the transceiver comprising:

a state machine for receiving a plurality of mode control signals, the state machine providing a plurality of transmit control signals in response to the plurality of mode control signals; and a transmit output circuit having a first input for receiving the plurality of mode control signals, having a second input for receiving a plurality of transmit control signals, and having a third input for receiving the plurality of unmodulated digital data values in a first format, the receive output circuit receiving the plurality of demodulated digital data values in the first format to provide the plurality of demodulated audio data values in a second format, the transmit output circuit comprising:

a plurality of multiplexors having a first input for receiving the plurality of mode control signals and a second input for receiving the unmodulated digital data values in the first format, each of the plurality of multiplexors selectively providing a portion of one of the plurality of unmodulated digital data values in response to the plurality of mode control signals; and a plurality of shift registers, one of the plurality of shift registers selectively storing the portion of the one of the plurality of unmodulated digital data values; and a digital audio modulator for receiving the plurality of unmodulated digital audio data values in the second format, the digital audio modulator modulating the plurality of digital audio data values to provide a plurality of modulated audio data values to the modulated digital audio sink.

10. The transceiver of claim 9 wherein the second format is comprised of a first audio channel having a first bit width, a first non-audio channel having a second bit width, a second audio channel having a third bit width, and a second non-audio channel having a fourth bit width, the first format transferring the plurality of digital data in the order of the first audio channel, the first non-audio channel, the second audio channel, and the second non-audio channel.

11. The transceiver of claim 9 wherein the first format of one of the plurality of demodulated data values is provided by receiving, in order, a first audio channel having a first bit width, a second audio channel having a second bit width, a first non-audio channel having a third bit width, a second non-audio channel having a fourth bit width.

12. The transceiver of claim 11 wherein the first format is further formed by receiving a reserved data value after transferring the second non-audio channel.

13. The transceiver of claim 9 wherein the first format of one of the plurality of demodulated data values is provided by receiving, in order, a first audio channel having a first bit width and a second audio channel having a second bit width, a first non-audio channel having a third bit width and a second non-audio channel having a fourth bit width, the first non-audio channel and the second non-audio channel being concurrently received with the first and second audio channels.

14. The transceiver of claim 9 wherein the first format of one of the plurality of demodulated data values is provided by receiving, in order, a first audio channel having a first bit width, a first non-audio channel having a third bit width, a second non-audio channel having a fourth bit width, a second audio channel having a second bit width, and a reserved data value.

15. The transceiver of claim 9 wherein the first format of one of the plurality of demodulated data values is provided by receiving, in order, a first audio channel having a first bit width and a first reserved data value, concurrently transferring a second audio channel having a second bit width and a second reserved data value, and a first non-audio channel value having a third bit width and a second non-audio channel value having a fourth bit width are transferred concurrently with the first and second audio channels.

16. A method for communicating a plurality of digital audio data values between a modulated digital audio source and an unmodulated digital audio sink, comprising the steps of:

receiving the plurality of digital audio data values from the modulated digital audio source;

receiving a plurality of mode control signals from the unmodulated digital audio sink;

demodulating the plurality of digital audio data values to provide a plurality of demodulated audio data values in a first format, wherein the first format is comprised of a first audio channel having a first bit width, a first non-audio channel having a second bit width, a second audio channel having a third bit width, and a second non-audio channel having a fourth bit width, the first format transferring the plurality of digital data in the order of the first audio channel, the first non-audio channel, the second audio channel, and the second non-audio channel;

storing each of the plurality of demodulated audio data values in a plurality of storage registers;

selectively rearranging each of the plurality of demodulated audio data values stored in the plurality of storage registers by retrieving each of the plurality of demodulated audio data values stored in the plurality of storage registers in a second format, the second format determined in accordance with the plurality of mode control signals, the second format transferring one of the plurality of demodulated audio data values in the order of a first audio channel having a first bit width, a second audio channel having a second bit width, a first non-audio channel having a third bit width, a second non-audio channel having a fourth bit width; and providing the plurality of demodulated audio data values to the unmodulated digital audio sink in the second format.

17. The method of claim 16 wherein the second format transfers a reserved data value after transferring the second non-audio channel.

18. A method for communicating a plurality of digital audio data values between a modulated digital audio source and an unmodulated digital audio sink, comprising the steps of:

receiving the plurality of digital audio data values from the modulated digital audio source;

receiving a plurality of mode control signals from the unmodulated digital audio sink;

demodulating the plurality of digital audio data values to provide a plurality of demodulated audio data values in a first format, wherein the first format is comprised of a first audio channel having a first bit width, a first non-audio channel having a second bit width, a second audio channel having a third bit width, and a second non-audio channel having a fourth bit width, the first format transferring the plurality of digital data in the order of the first audio channel, the first non-audio channel, the second audio channel, and the second non-audio channel;

storing each of the plurality of demodulated audio data values in a plurality of storage registers;

selectively rearranging each of the plurality of demodulated audio data values stored in the plurality of storage registers by retrieving each of the plurality of demodulated audio data values stored in the plurality of storage registers in a second format, the second format determined in accordance with the plurality of mode control signals, the second format transferring; and providing the plurality of demodulated audio data values to the unmodulated digital audio sink in the second format.

19. A method for communicating a plurality of digital audio data values between a modulated digital audio source and an unmodulated digital audio sink, comprising the steps of:

receiving the plurality of digital audio data values from the modulated digital audio source;

receiving a plurality of mode control signals from the unmodulated digital audio sink;

demodulating the plurality of digital audio data values to provide a plurality of demodulated audio data values in a first format, wherein the first format is comprised of a first audio channel having a first bit width, a first non-audio channel having a second bit width, a second audio channel having a third bit width, and a second non-audio channel having a fourth bit width, the first format transferring the plurality of digital data in the order of the first audio channel, the first non-audio channel, the second audio channel, and the second non-audio channel;

storing each of the plurality of demodulated audio data values in a plurality of storage registers;

selectively rearranging each of the plurality of demodulated audio data values stored in the plurality of storage registers by retrieving each of the plurality of demodulated audio data values stored in the plurality of storage registers in a second format, the second format determined in accordance with the plurality of mode control signals, the second format transferring one of the plurality of demodulated audio data values in the order of a first audio channel having a first bit width and a first reserved data value, concurrently transferring a second audio channel having a second bit width and a second reserved data value, and concurrently transferring a first non-audio channel value having a third bit width and a second non-audio channel value having a fourth bit width; and providing the plurality of demodulated audio data values to the unmodulated digital audio sink in the second format.

20. A method for communicating a plurality of digital audio data values between an unmodulated digital audio source and a modulated digital audio sink, comprising the steps of:

receiving a plurality of mode control signals from the unmodulated digital audio source;

receiving the plurality of unmodulated audio data values from the unmodulated digital audio source in a first format;

selectively storing a portion of one of the plurality of unmodulated digital data values in one of a plurality of storage registers in response to the plurality of mode control signals;

retrieving each portion of the one of the plurality of unmodulated digital data values in a second format;

providing the plurality of unmodulated audio data values in the second format, and modulating the plurality of digital audio data values to provide a plurality of modulated audio data values to the modulated digital audio sink.

21. The method of claim 20 wherein the second format is comprised of a first audio channel having a first bit width, a first non-audio channel having a second bit width, a second audio channel having a third bit width, and a second non-audio channel having a fourth bit width, the first format transferring the plurality of digital data in the order of the first audio channel, the first non-audio channel, the second audio channel, and the second non-audio channel.

22. The method of claim 20 wherein the first format of one of the plurality of unmodulated data values is provided by receiving, in order, a first audio channel having a first bit width, a second audio channel having a second bit width, a first non-audio channel having a third bit width, a second non-audio channel having a fourth bit width.

23. The method of claim 22 wherein the first format is further formed by receiving a reserved data value after transferring the second non-audio channel.

24. The method of claim 20 wherein the first format of one of the plurality of unmodulated data values is provided by receiving, in order, a first audio channel having a first bit width and a second audio channel having a second bit width, a first non-audio channel having a third bit width and a second non-audio channel having a fourth bit width being received concurrently with the first and second audio channels.

25. The method of claim 20 wherein the first format of one of the plurality of unmodulated data values is provided by receiving, in order, a first audio channel having a first bit width, a first non-audio channel having a third bit width, a second non-audio channel having a fourth bit width, a second audio channel having a second bit width, and a reserved data value.

26. A method for communicating a plurality of digital audio data values between an unmodulated digital audio source and a modulated digital audio sink, comprising the steps of:

receiving a plurality of mode control signals from the unmodulated digital audio source;

receiving the plurality of unmodulated audio data values from the unmodulated digital audio source in a first format, wherein the first format of one of the plurality of unmodulated data values is provided by receiving, in order, a first audio channel having a first bit width and a first reserved data value, concurrently transferring a second audio channel having a second bit width and a second reserved data value, and concurrently transferring a first non-audio channel value having a third bit width and a second non-audio channel value having a fourth bit width with the first and second audio channels;

selectively storing a portion of one of the plurality of unmodulated digital data values in one of a plurality of storage registers in response to the plurality of mode control signals;

retrieving each portion of the one of the plurality of unmodulated digital data values in a second format; and providing the plurality of unmodulated audio data values in the second format.

\* \* \* \* \*